United States Patent
Ushiki

(10) Patent No.: US 10,679,023 B2
(45) Date of Patent: Jun. 9, 2020

(54) TWO-DIMENSIONAL CODE, TWO-DIMENSIONAL CODE OUTPUT SYSTEM, TWO-DIMENSIONAL CODE OUTPUT METHOD, TWO-DIMENSIONAL CODE READING SYSTEM, AND TWO-DIMENSIONAL CODE READING METHOD

(71) Applicant: OPTOELECTRONICS CO., LTD., Warabi-shi (JP)

(72) Inventor: Takashi Ushiki, Warabi (JP)

(73) Assignee: OPTOELECTRONICS CO., LTD., Warabi-Shi (JP)

( * ) Notice: Subject to any disclaimer, the term of this patent is extended or adjusted under 35 U.S.C. 154(b) by 0 days.

(21) Appl. No.: 16/163,054

(22) Filed: Oct. 17, 2018

(65) Prior Publication Data
US 2019/0266372 A1     Aug. 29, 2019

(30) Foreign Application Priority Data

Feb. 26, 2018  (JP) ................... 2018-032538

(51) Int. Cl.
*G06K 7/10*     (2006.01)
*G06K 7/14*     (2006.01)
(Continued)

(52) U.S. Cl.
CPC ............. *G06K 7/1417* (2013.01); *H04L 9/30* (2013.01); *H04W 12/04* (2013.01); *H04W 12/12* (2013.01)

(58) Field of Classification Search
CPC ....... G06K 7/1417; H04L 9/30; H04W 12/04; H04W 12/12
(Continued)

(56) References Cited

U.S. PATENT DOCUMENTS 6,267,296 B1    7/2001  Ooshima
6,321,986 B1   11/2001  Ackley
(Continued)

FOREIGN PATENT DOCUMENTS

JP    2009009547 A    1/2009
JP    2009093443 A    4/2009
(Continued)

OTHER PUBLICATIONS

Copending U.S. Appl. No. 16/162,958, filed Oct. 17, 2018.
(Continued)

*Primary Examiner* — Karl D Frech
(74) *Attorney, Agent, or Firm* — Rossi, Kimms & McDowell LLP

(57) ABSTRACT

A two-dimensional code includes: a first code symbol coding first information being a first valid information according to a first standard; a terminator pattern indicating an end of the valid information according to the first standard; and a second code symbol arranged after the terminator pattern in a region in which valid information can be arranged according to the first standard, and coding, according to a second standard different from the first standard, verification data encrypted using a private key, the verification data being for verifying correctness of the first valid information. The verification data may be signature data included in non-output data.

14 Claims, 14 Drawing Sheets

(51) Int. Cl.
*H04L 9/30* (2006.01)
*H04W 12/04* (2009.01)
*H04W 12/12* (2009.01)

(58) Field of Classification Search
USPC .................................................. 235/462.1
See application file for complete search history.

(56) References Cited

U.S. PATENT DOCUMENTS

| | | |
|---|---|---|
| 8,459,567 B2 | 6/2013 | Hovis |
| 9,710,741 B2 | 7/2017 | Nosaka |
| 9,892,300 B2 | 2/2018 | Hosokane |
| 10,417,543 B2 | 9/2019 | Nemet |
| 2010/0245213 A1 | 9/2010 | Ideguchi |
| 2011/0303754 A1 | 12/2011 | Shinotani et al. |
| 2018/0114045 A1* | 4/2018 | Ebrahimi .............. H04L 9/0618 |

FOREIGN PATENT DOCUMENTS

| | | |
|---|---|---|
| JP | 5023949 B2 | 9/2012 |
| JP | 2013080329 A | 5/2013 |
| JP | 2014029659 A | 2/2014 |
| JP | 2016187146 A | 10/2016 |
| JP | 6020089 B2 | 11/2016 |
| WO | 2009072363 A1 | 6/2009 |
| WO | 2010097989 A1 | 9/2010 |

OTHER PUBLICATIONS

Office Action issued in U.S. Appl. No. 16/162,958 dated Nov. 14, 2019.
Office Action issued in Japanese Appln. No. 2018-032538 dated Feb. 4, 2020. English machine translation provided.
Office Action issued in Japanese Appln. No. 2018-032537 dated Feb. 4, 2020. English machine translation provided.
Notice of Allowance issued in U.S. Appl. No. 16/162,958 dated Jan. 27, 2020.

* cited by examiner

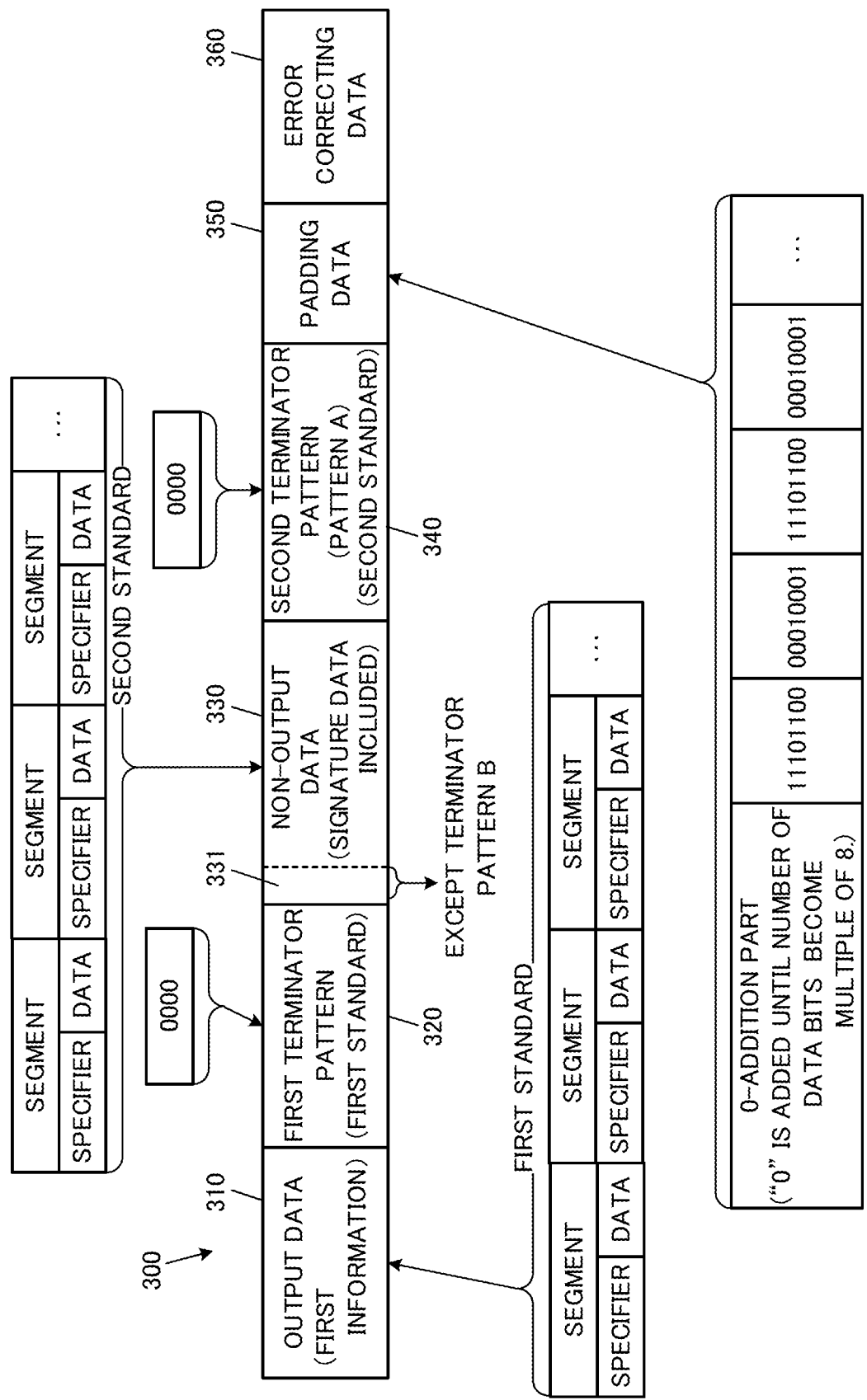
{Fig. 1}

{Fig.2}

| MODE | SPECIFIER | DETA LENGTH |
|---|---|---|
| TERMINATOR PATTERN B | 0111 | NO DATA |
| TERMINATOR PATTERN B | 0001 | NO DATA |
| ALPHANUMERIC CHARACTER | 0010 | VARIABLE LENGTH |
| 8-BIT BYTES | 0100 | VARIABLE LENGTH |
| CHINESE CHARACTER | 1000 | VARIABLE LENGTH |
| RESERVED | 0101 | |
| RESERVED | 1001 | |
| TERMINATOR PATTERN B | 0011 | NO DATA |
| TERMINATOR PATTERN A/B | 0000 | NO DATA |
| NUMERAL | 0110 | VARIABLE LENGTH |
| SIGNATURE DATA | 1010 | VARIABLE LENGTH (REQUIRED) |
| TERMINATOR PATTERN B | 1110 | NO DATA |
| PUBLIC KEY ID | 1011 | VARIABLE LENGTH (OPTIONAL) |
| RESERVED | 1100<br>1101<br>1111 | |

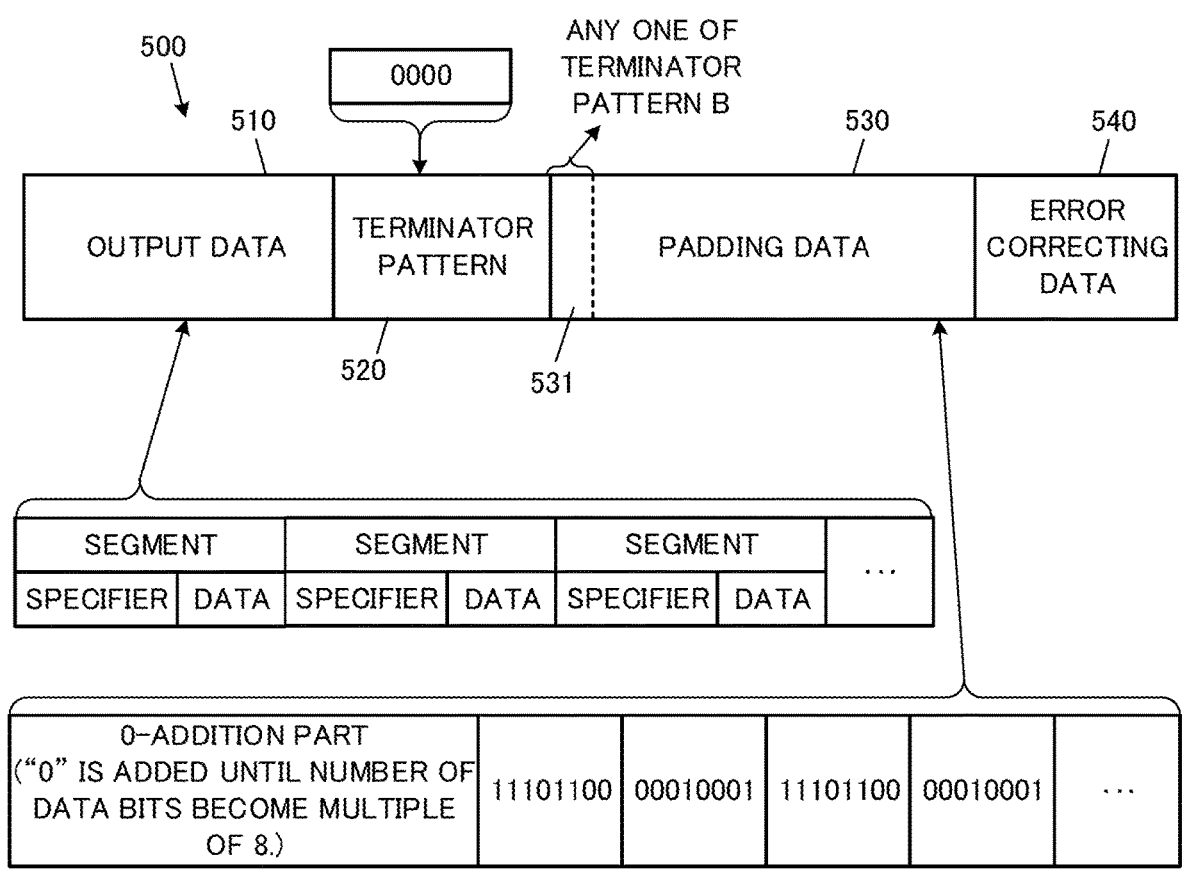

{Fig. 4}
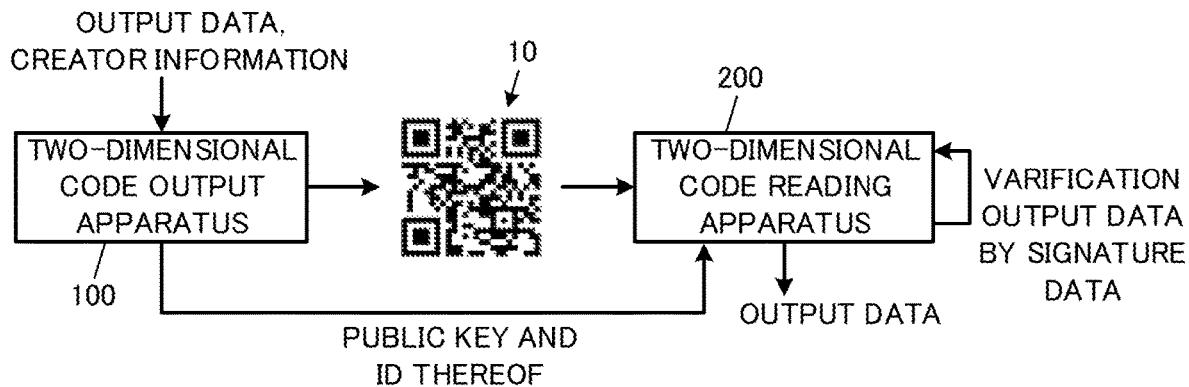
{Fig. 5}
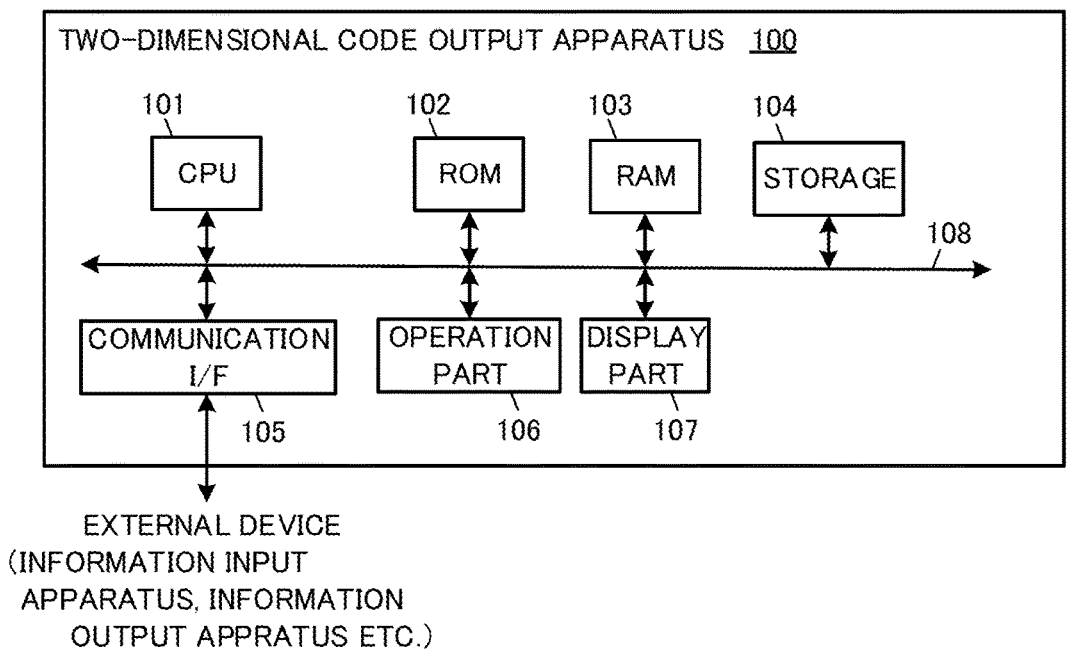

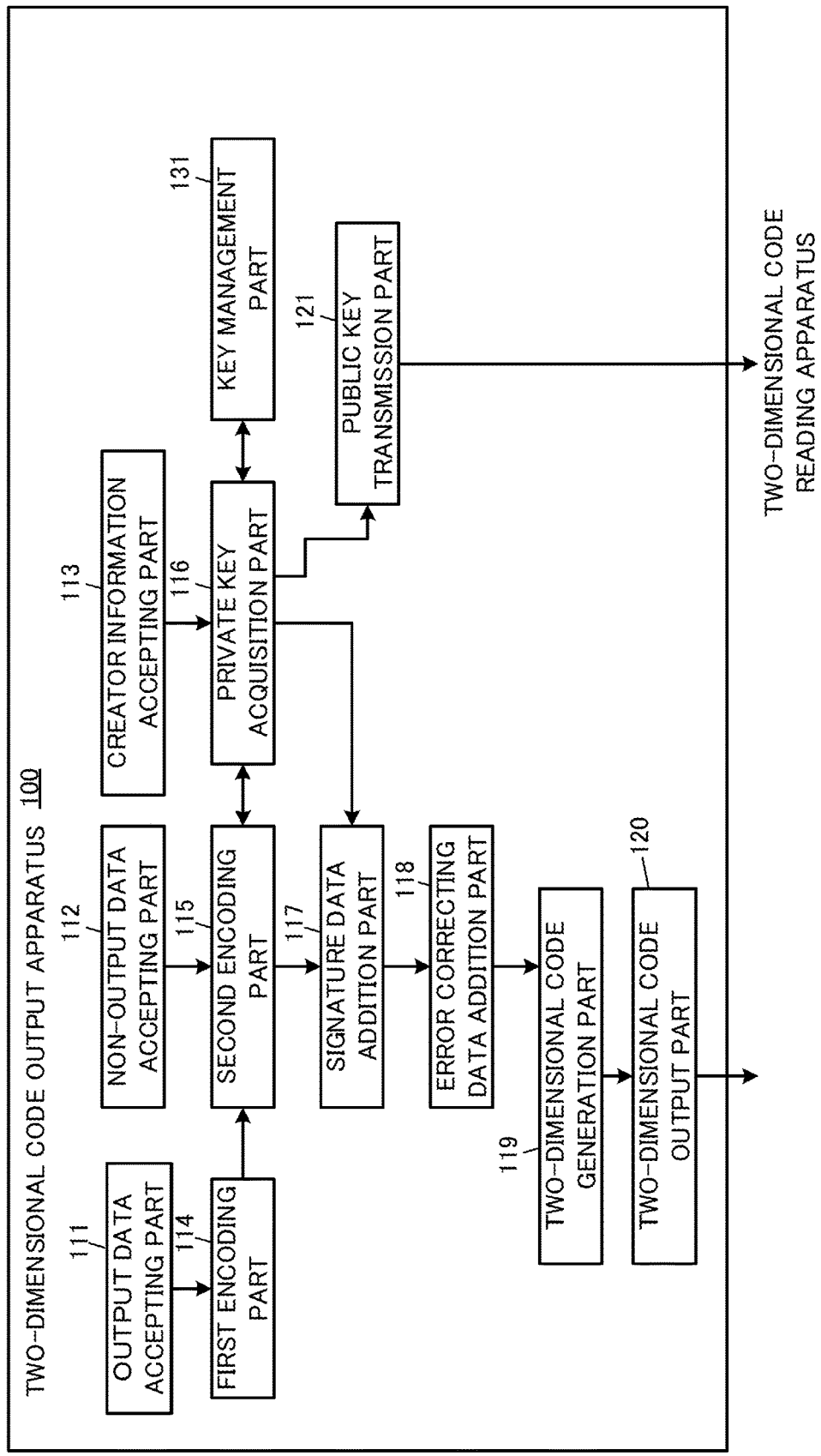

{Fig. 7}
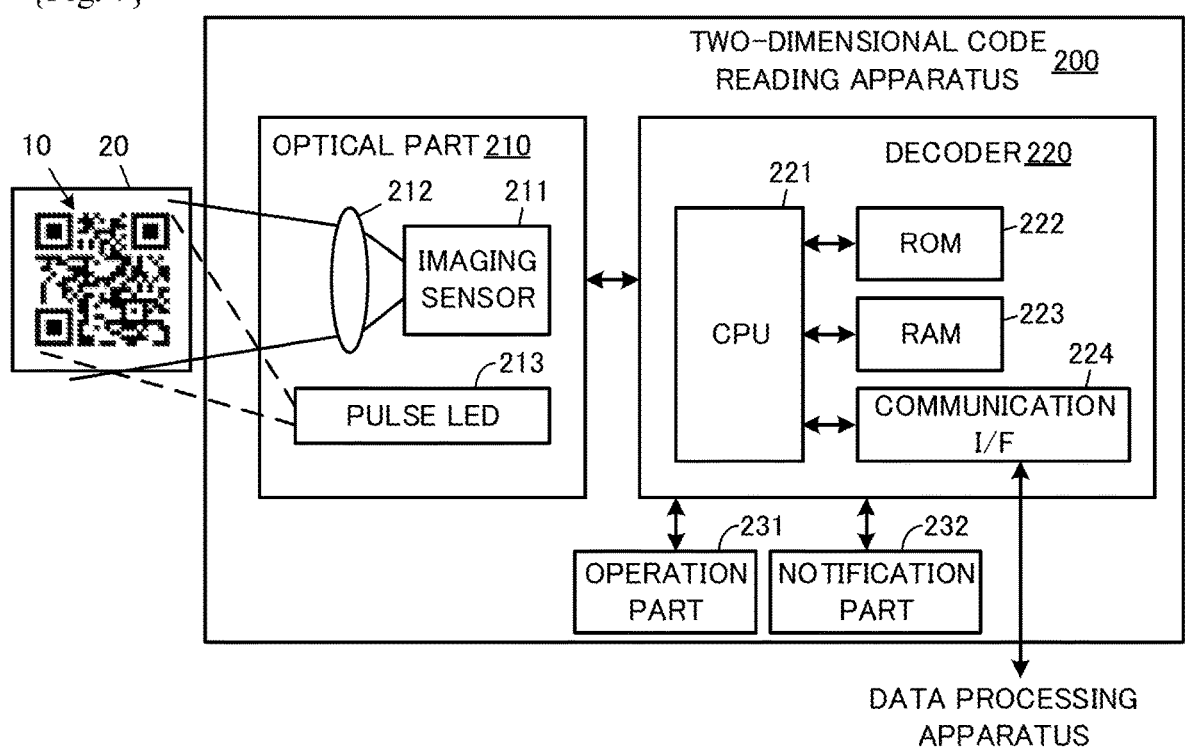

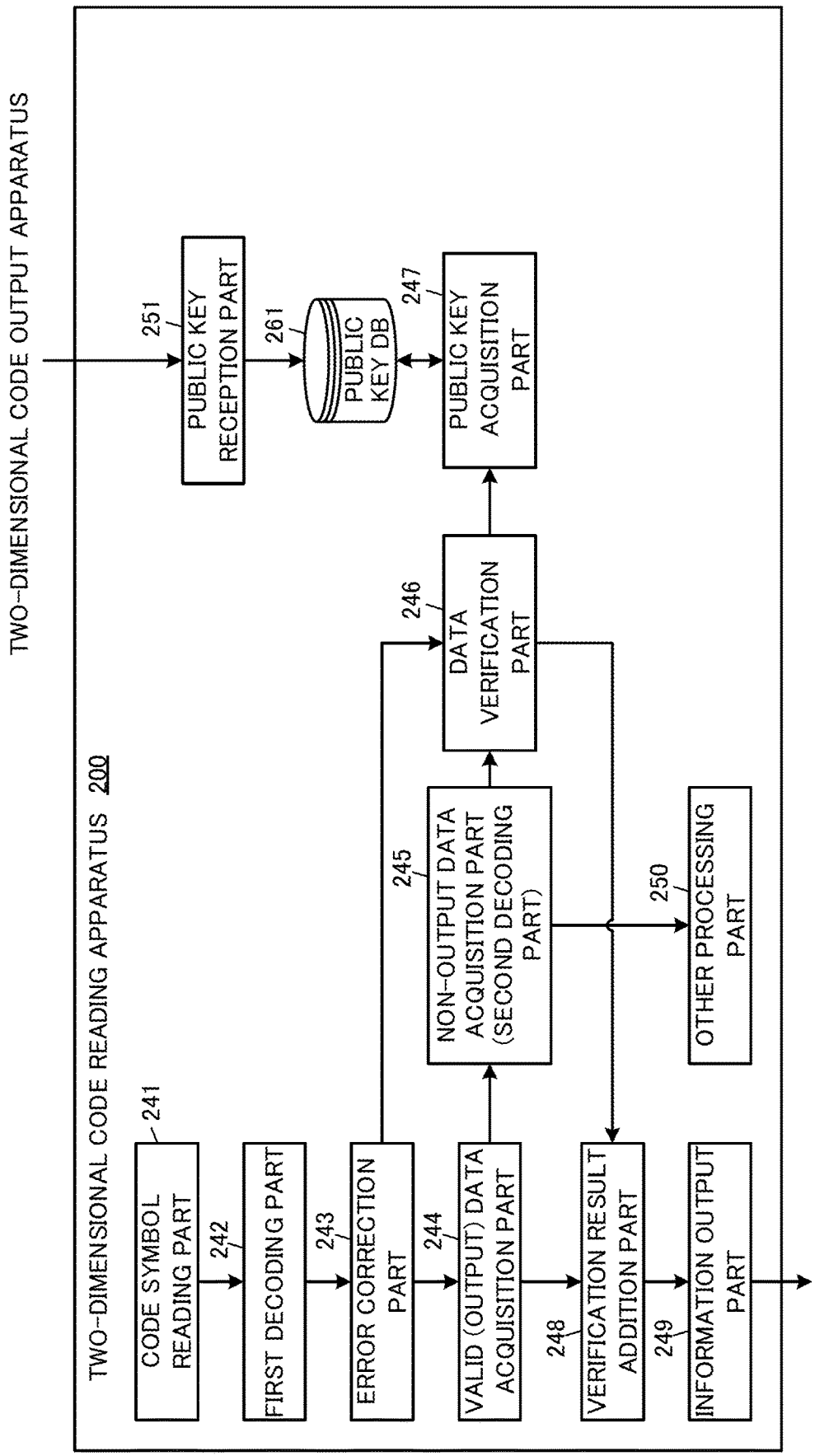
{Fig. 8}

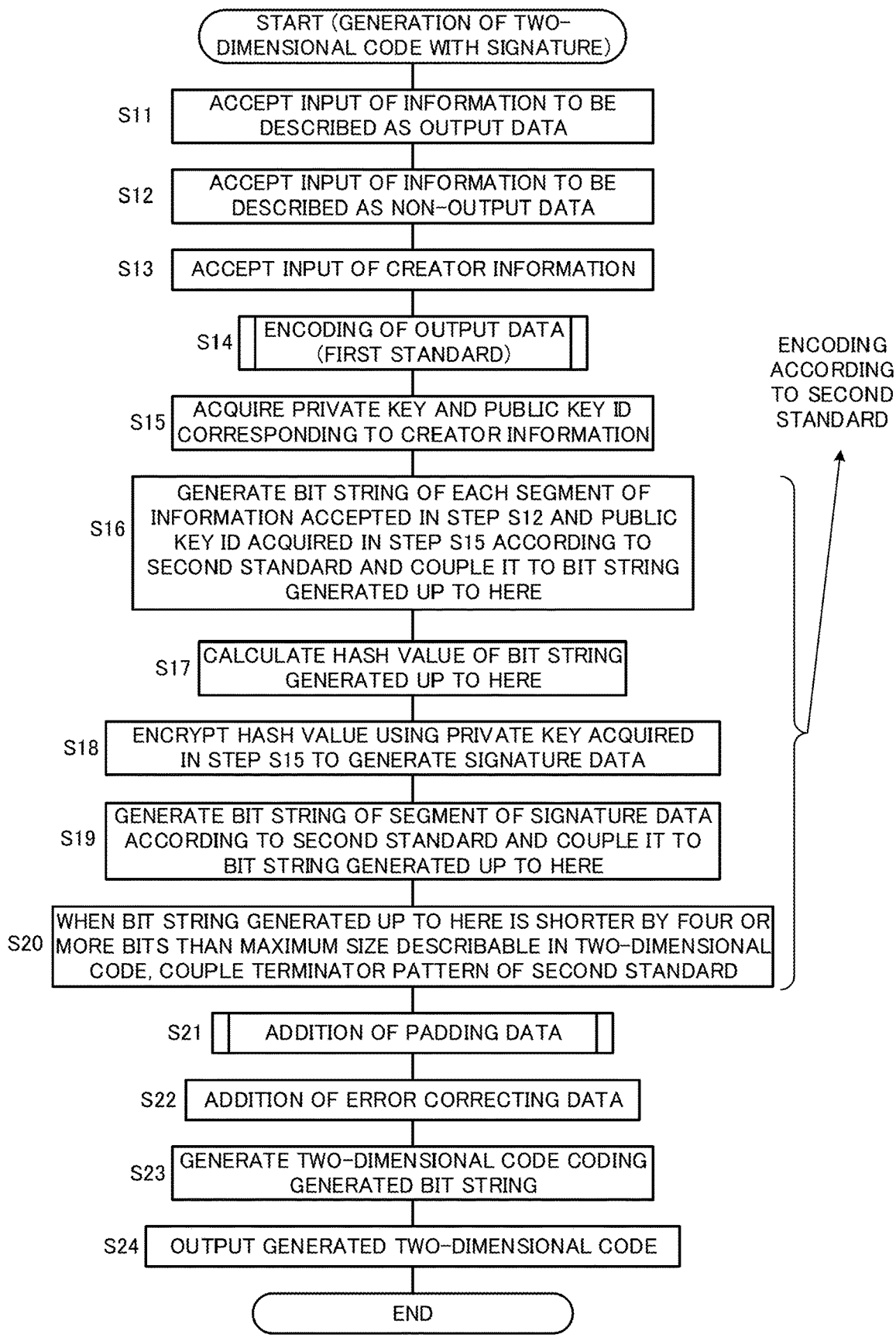

{Fig. 10}
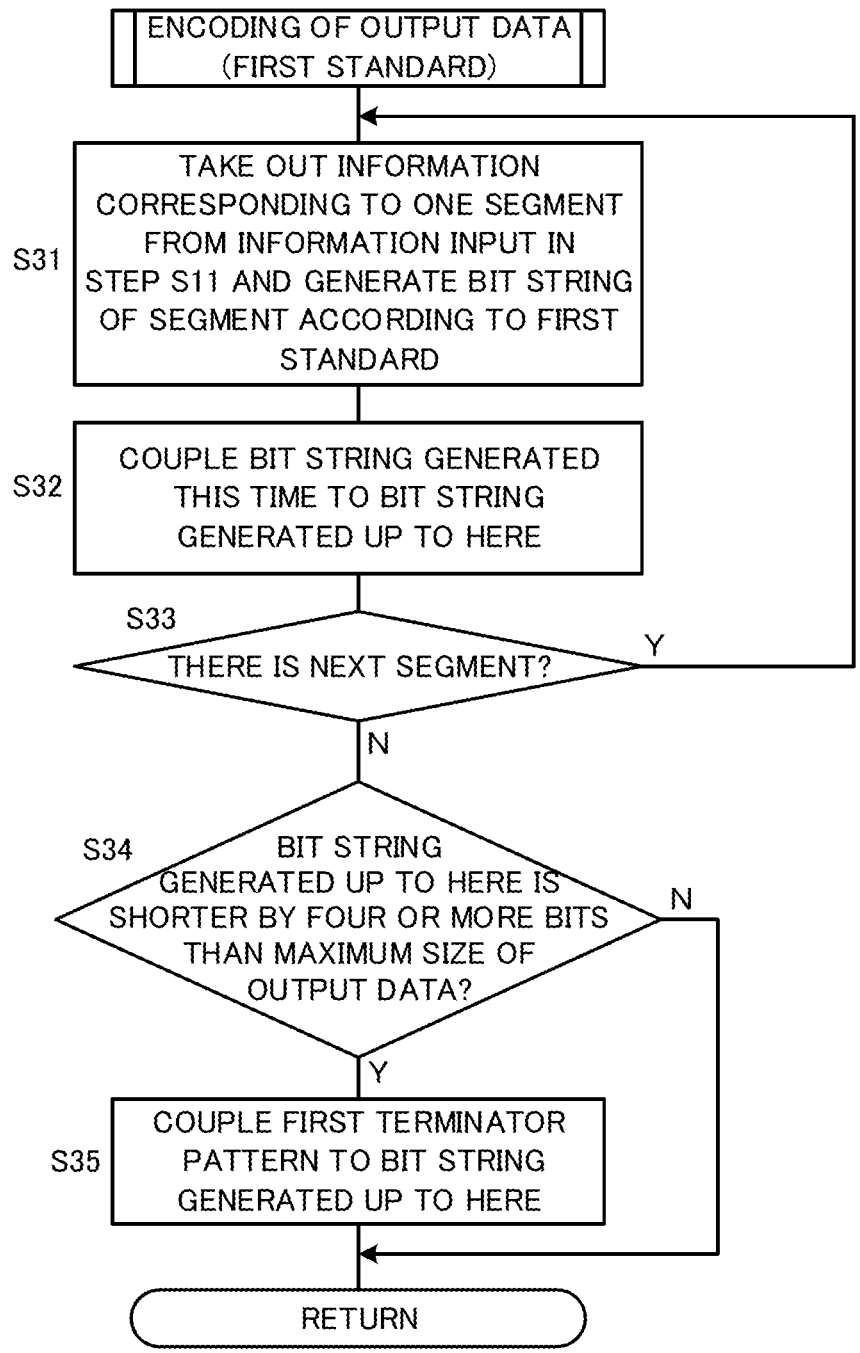

{Fig. 11}
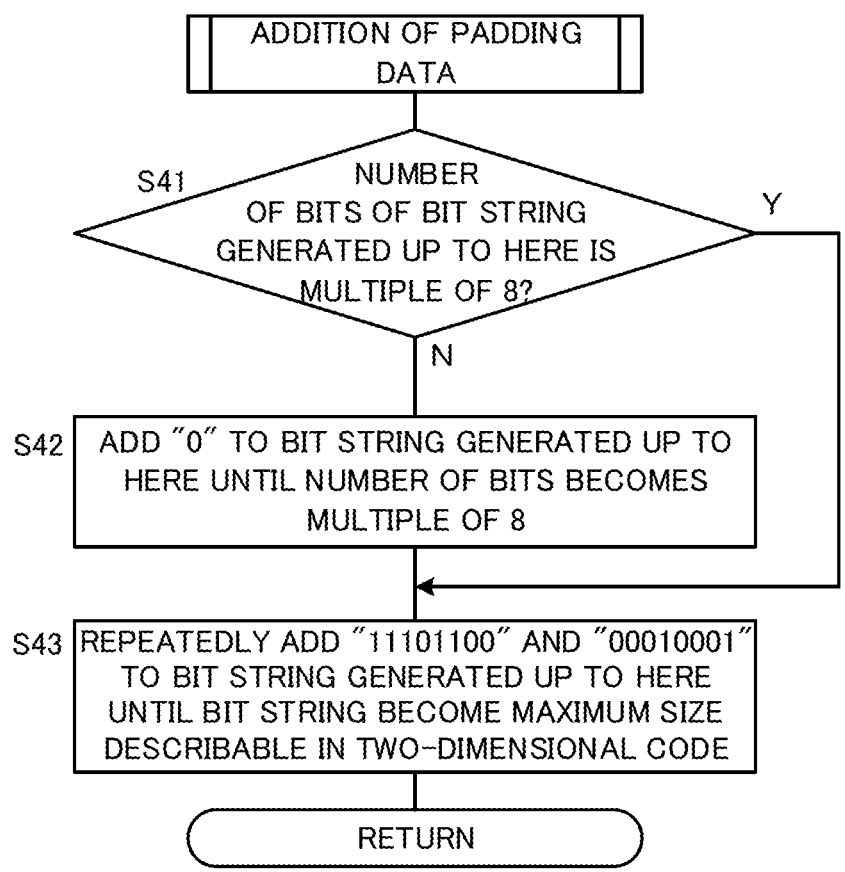

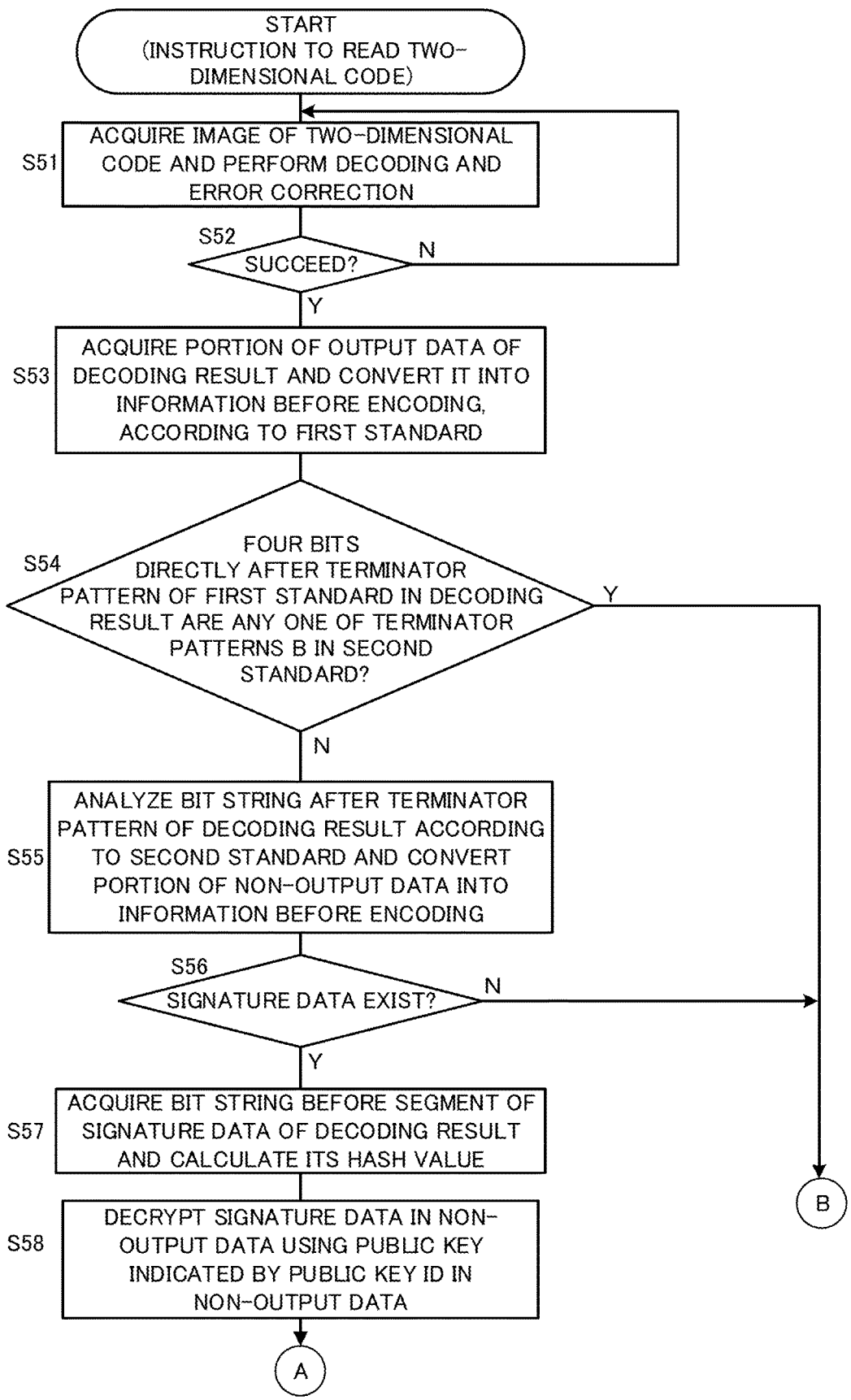
{Fig. 12A}

{Fig. 12B}
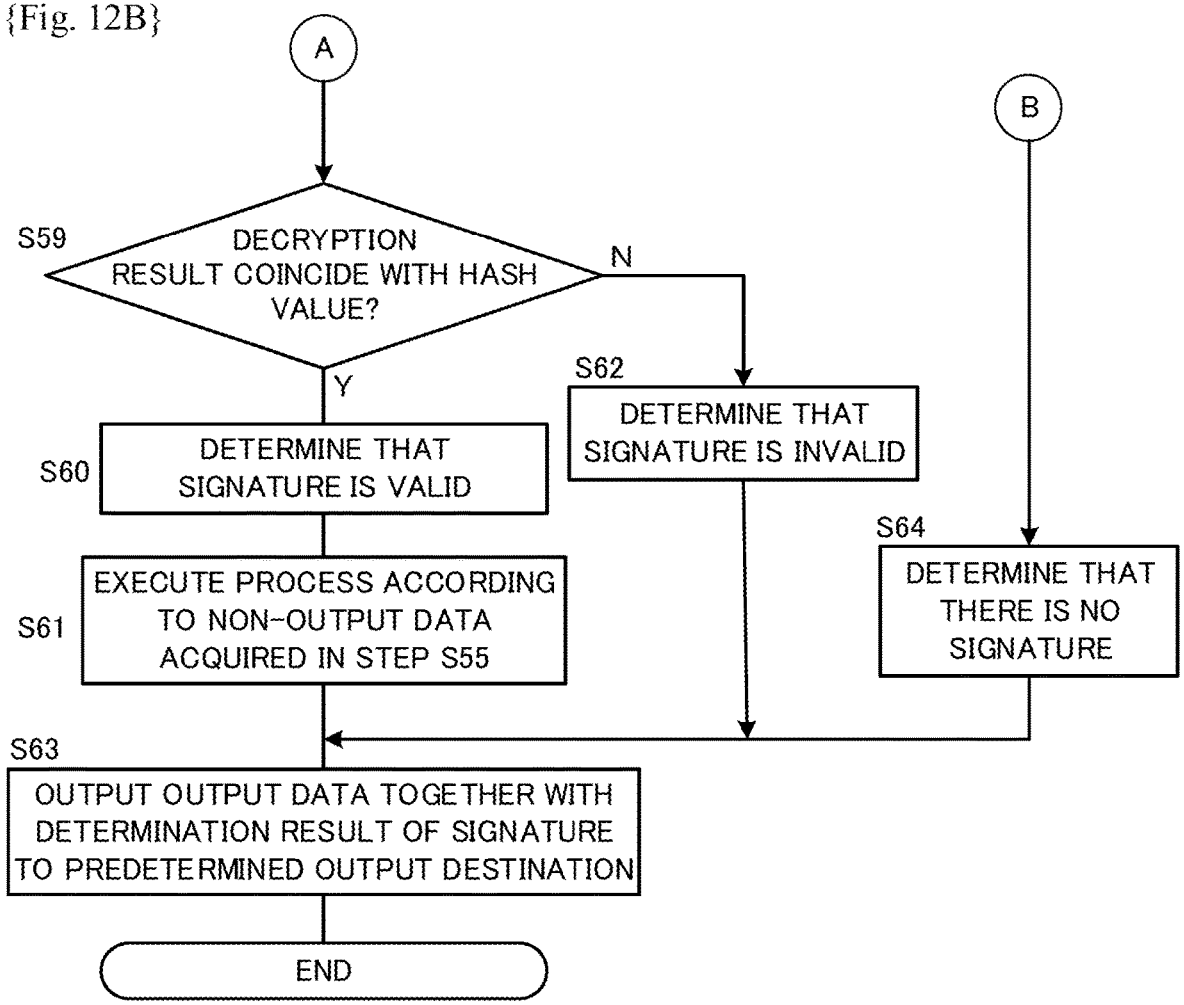

{Fig. 13}
{Fig. 14}
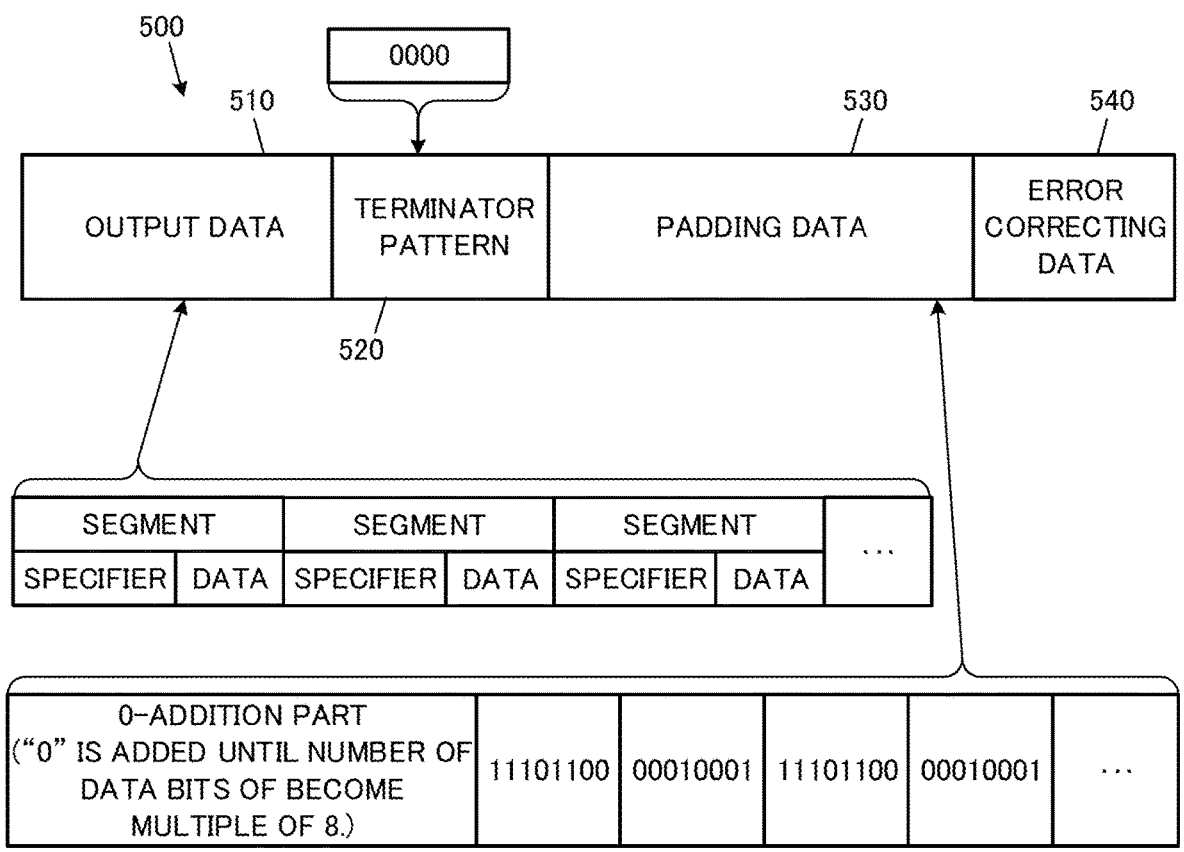

{Fig. 15}
| MODE | SPECIFIER | DETA LENGTH |
|---|---|---|
| ECI | 0111 | FIXED LENGTH |
| NUMERAL | 0001 | VARIABLE LENGTH |
| ALPHANUMERIC CHARACTER | 0010 | VARIABLE LENGTH |
| 8-BIT BYTES | 0100 | VARIABLE LENGTH |
| CHINESE CHARACTER | 1000 | VARIABLE LENGTH |
| FNC1 (FIRST) | 0101 | NO DATA |
| FNC1 (SECOND) | 1001 | NO DATA |
| STRUCTURED APPEND | 0011 | FIXED LENGTH |
| TERMINATOR PATTERN | 0000 | NO DATA |
| RESERVED | 0110 | |
| | 1010 | |
| | 1011 | |
| | 1100 | |
| | 1101 | |
| | 1110 | |
| | 1111 | |
{Fig. 16}

TWO-DIMENSIONAL CODE, TWO-DIMENSIONAL CODE OUTPUT SYSTEM, TWO-DIMENSIONAL CODE OUTPUT METHOD, TWO-DIMENSIONAL CODE READING SYSTEM, AND TWO-DIMENSIONAL CODE READING METHOD

TECHNICAL FIELD

The invention relates to a two-dimensional code representing information by code symbols, a two-dimensional code output system and a two-dimensional code output method for outputting the two-dimensional code, a two-dimensional code reading system and a two-dimensional code reading method for reading the two-dimensional code, and a non-transitory machine-readable storage medium containing program instructions for causing one computer or a plurality of computers in cooperation to execute the two-dimensional code output method or the two-dimensional code reading method.

BACKGROUND ART

A two-dimensional code as illustrated in FIG. 13 representing various kinds of information by code symbols is conventionally known. The two-dimensional code represents a binary bit string by an array of white modules and black modules different from each other in light reflectance, and the bit string represents information, for example, in a form illustrated in FIG. 15.

A bit string (encoded data) 500 illustrated in FIG. 14 contains output data 510, a terminator pattern 520, padding data 530, and error correcting data 540.

The output data 510 is valid information to be output as a reading result of the two-dimensional code and includes a plurality of segments. Each of the segments is defined in a standard for the two-dimensional code and contains a specifier specifying a mode of the segment (the kind and format of data to be described in the segment) and a data body of the segment.

FIG. 15 illustrates examples of the kinds of the mode to be used in the two-dimensional code. As illustrated in FIG. 15, the modes include ones having data of a fixed length and ones having data of a variable length, and data indicating the data length is also contained in the segment in the mode of the variable length as illustrated in FIG. 16. The segment without data is composed only of a specifier.

The terminator pattern 520 is a bit string indicating the end of the valid information, and the data after the terminator pattern 520 is not output as the reading result of the two-dimensional code.

The padding data 530 is a pattern defined in the standard for the two-dimensional code as invalid data for filling an extra space. In the example in FIG. 14, the padding data 530 is a pattern provided with a repeated part of "11101100" and "00010001" after a 0-addition part. The bit string for being converted into the two-dimensional code needs to have a specific length determined in the standard, and therefore when the output data 510 is shorter, the extra space needs to be filled.

The error correcting data 540 is data used for error correction in reading the two-dimensional code, such as a Reed-Solomon code.

In the bit string 500, the valid information can be arranged in the whole region other than the error correcting data 540, but the amount of the output data 510 is smaller than the size of the region in the example of FIG. 14, and therefore the terminator pattern 520 is arranged and then the residual is filled with the padding data 530.

Further, PTL1 discloses a two-dimensional code recording key data used for decrypting encrypted data coded in a code specification of the two-dimensional code, in an overlapping manner in a configuration in which the key data is written over at least one of the encrypted data and error correcting data.

PTL2 discloses a technique in which a two-dimensional code made by encoding a predetermined information and detection information for detecting fraudulence regarding the predetermined information is used and, in reading the two-dimensional code, a reading apparatus transmits the detection information obtained by decoding the two-dimensional code to a fraudulence detection apparatus, and the fraudulence detection apparatus collates the detection information with information registered in advance to thereby detect whether or not there is fraudulence in the information coded in the two-dimensional code, and reports the result to the reading apparatus.

CITATION LIST

Patent Literature

{PTL1} JP 5023949 B2
{PTL2} JP 6020089 B2

SUMMARY OF INVENTION

Technical Problem

According to the technique disclosed in PTL2, it is possible to detect whether or not fraudulence such as tampering or the like has been performed on the information coded in the two-dimensional code, using the detection information in reading the two-dimensional code. However, for the detection, a fraudulence detection apparatus is required in addition to the two-dimensional code reading apparatus, bringing about a problem that the system becomes large in scale to increase the burden of the cost and management.

Further, to surely detect fraudulence, falsification of the detection information has to be prevented and, for this end, it is effective to lengthen the detection information. On the other hand, the detection information itself is not information to be presented to a general user. Therefore, it is preferable that the detection information can be described as information discriminated from another information to be presented to the general user.

Regarding this point, according to the method disclosed in PTL1, data other than data to be output when a certain two-dimensional code is read can be described in the same two-dimensional code in a form hard to visually recognize (refer to paragraph 0039 of PTL1).

However, in the method of PTL1, other data is recorded in an overlapping manner over a part of the encrypted data and the error correcting data, and therefore there is a problem of a large constraint on the amount of data recordable in an overlapping manner in consideration of retaining sufficient error correction capability.

An object of the invention is to solve the above problem and to provide an environment in which fraudulence to information described by a two-dimensional code can be detected by a simple system while retaining high reliability.

Solution to Problem

To solve the above problem, a two-dimensional code of the invention includes: a first code symbol coding a first valid information according to a first standard; a terminator pattern indicating an end of the first valid information according to the first standard; and a second code symbol arranged after the terminator pattern in a region in which valid information can be arranged according to the first standard, and coding, according to a second standard different from the first standard, verification data encrypted using a private key, the verification data being for verifying correctness of the first valid information.

Further, a two-dimensional code output system of the invention includes at least one processor or circuitry or a combination thereof configured to: accept input of first information via an input device; encode the first information according to a first standard, into a first bit string; generate verification data for verifying correctness of the first bit string; encrypt the verification data using a private key into encrypted verification data; encode the encrypted verification data according to a second standard into a second bit string; generate a combined bit string including the first bit string, terminator data indicating an end of valid information according to the first standard, and the second bit string in this order; convert the combined bit string into a two-dimensional code according to the first standard, thereby generating the two-dimensional code comprising: a first code symbol coding the first information as a first valid information according to the first standard; a terminator pattern coding the terminator data; and a second code symbol arranged after the terminator pattern in a region in which valid information can be arranged according to the first standard and coding the encrypted verification data according to the second standard; and output the two-dimensional code.

In the above two-dimensional code or the two-dimensional code output system, it is conceivable that the second code symbol includes a code symbol coding, according to the second standard, identification information of a public key corresponding to the private key.

In the above two-dimensional code output system, it is conceivable that the at least one processor or circuitry or the combination is further configured to: accept input of information on a creator via an input device; and acquire a private key corresponding to the information on the creator from a predetermined acquisition destination, and the encrypting of the verification data is encrypting the verification data using the acquired private key.

It is also conceivable that the two-dimensional code includes a third code symbol coding error correcting data according to the first standard, for correcting errors in the first code symbol and the second code symbol, in the above two-dimensional code or the two-dimensional code output system.

Further, a two-dimensional code reading system of the invention includes at least one processor or circuitry or a combination thereof configured to: reads a two-dimensional code by a reader, decode the two-dimensional code according to a first standard having a definition of a terminator pattern indicating an end of valid information, and thereby obtaining a decoding result; acquire valid information according to the first standard from the decoding result, as first information; and analyze information after the terminator pattern of the decoding result according to a second standard different from the first standard, and thereby acquire verification data; acquire a public key from a predetermined acquisition destination; decrypt the verification data using the acquired public key to obtain decrypted data; compare the decrypted data with the first information to verify correctness of the first information; and output the first information together with information indicating a result of the verification.

In such a two-dimensional code reading system, it is conceivable that the at least one processor or circuitry or the combination is further configured to acquire identification information of the public key from a result of the analysis of the information after the terminator pattern, and as the public key, a public key corresponding to the acquired identification information is acquired.

Further, it is conceivable that the at least one processor or circuitry or the combination is further configured to, in a case of failing to acquire the verification data through the analysis of the information after the terminator pattern, output the first information together with information indicating that there is no verification data.

Further, it is conceivable that the at least one processor or circuitry or the combination is further configured to perform error correction on a target region including at least a first sub-region in which the first information is described and a second sub-region in which the verification data is described, of the decoding result, using error correcting data contained in the decoding result, the first information is acquired from the decoding result after the error correction, and the verification data is acquired from the decoding result after the error correction.

Further, the invention can be embodied as an arbitrary mode such as a device, a method, a computer program, a non-transitory machine-readable storage medium, or the like, other than the above two-dimensional code or systems.

Advantageous Effects of Invention

According to the above configuration of the present invention, it is possible to provide an environment in which fraudulence to information described by a two-dimensional code can be detected by a simple system while retaining high reliability.

BRIEF DESCRIPTION OF DRAWINGS

FIG. 1 is a diagram illustrating an example of a configuration of information contained in a two-dimensional code being one embodiment of the invention.

FIG. 2 is a diagram illustrating examples of standards of formats of non-output data in the information illustrated in FIG. 1.

FIG. 3 is a diagram illustrating an example of a configuration of information contained in a two-dimensional code according only to a first standard.

FIG. 4 is a diagram for explaining a use mode of a two-dimensional code output apparatus and a two-dimensional code reading apparatus handling the two-dimensional code being one embodiment of the invention.

FIG. 5 is a diagram illustrating a hardware configuration of the two-dimensional code output apparatus being one embodiment of the invention.

FIG. 6 is a diagram illustrating a functional configuration of the two-dimensional output apparatus illustrated in FIG. 5.

FIG. 7 is a diagram illustrating a hardware configuration of the two-dimensional code reading apparatus being one embodiment of the invention.

FIG. 8 is a diagram illustrating a functional configuration of the two-dimensional code reading apparatus illustrated in FIG. 7.

FIG. 9 is a flowchart of a two-dimensional code generation process executed by a CPU of the two-dimensional code output apparatus illustrated in FIG. 5.

FIG. 10 is a flowchart of an output data encoding process illustrated in FIG. 9.

FIG. 11 is a flowchart of a padding data adding process illustrated in FIG. 9.

FIG. 12A is a flowchart of a part of a two-dimensional code reading process executed by a CPU of the two-dimensional code reading apparatus illustrated in FIG. 7.

FIG. 12B is a flowchart continued from FIG. 12A.

FIG. 13 is a diagram illustrating an example of a conventional two-dimensional code.

FIG. 14 is a diagram illustrating an example of a configuration of information contained in the conventional two-dimensional code.

FIG. 15 is a diagram illustrating an example of a standard of a format of output data in the information illustrated in FIG. 14.

FIG. 16 is a diagram illustrating a configuration of a segment having a variable data length among segments in FIG. 14.

DESCRIPTION OF EMBODIMENTS

Embodiments of the invention will be explained referring to the drawings.

First, a two-dimensional code being one embodiment of the invention represents a binary bit string by an array of white modules and black modules different from each other in light reflectance, and the bit string represents information, for example, in the same form as illustrated in FIG. 14. More specifically, the two-dimensional code is hard to be discriminated from the conventionally-known two-dimensional code at a glance though the array of the modules is different according to the content of the represented bit string.

FIG. 1 illustrates an example of a configuration of information contained in a two-dimensional code being one embodiment of the invention.

A bit string (encoded data) 300 represented by the two-dimensional code of this embodiment includes output data 310, a first terminator pattern 320, non-output data 330, a second terminator pattern 340, padding data 350, and error correcting data 360.

The output data 310, the first terminator pattern 320, and the error correcting data 360 are data according to a first standard, and the standard explained using FIG. 13 to FIG. 16 is used here as the first standard. More specifically, the output data 310 is data including a plurality of segments and obtained by converting valid information to be output as a reading result of the two-dimensional code into a bit string according to the first standard. The first terminator pattern 320 is a bit string defined in the first standard and indicating the end of the valid information. The error correcting data 360 is data used for error correction in reading the two-dimensional code, such as a Reed-Solomon code. All of bits before the error correcting data 360 are the target of the error correction.

On the other hand, in the bit string 300, different from the bit string 500 in FIG. 14, the non-output data 330 and the second terminator pattern 340 are arranged in a region after the first terminator pattern 320. The valid information can be arranged in the region according to the first standard, but the region is filled with padding data 350 if the valid information is not arranged thereto.

The non-output data 330 is data obtained by converting arbitrary data which is not output as the reading result of the two-dimensional code into a bit string according to a second standard different from the first standard. The usage of the non-output data 330 is also arbitrary. In this example, the non-output data 330 also includes a plurality of segments as with the output data 310. Each of the segments is defined in the second standard and contains a specifier specifying a mode of the segment (the kind and format of data to be described in the segment) and a data body of the segment.

FIG. 2 illustrates examples of the kind of the mode to be used in the second standard. The modes include ones having data of a fixed length and ones having data of a variable length, and data indicating the data length is also contained in the segment in the mode of the variable length. These points are the same as in the case of the first standard. Note that in the second standard, to discriminate the non-output data 330 from the padding data according to the first standard, a terminator pattern B is defined in addition to a terminator pattern A indicating the end of the non-output data 330. The terminator pattern B will be explained later in detail.

Further, in the second standard, as information used for verifying that the data described as the output data 310 has been created by a reliable creator and has not been tampered (correctness), it is necessary to arrange a segment in which signature data being verification data is described, and its mode specifier is defined as "1010".

Further, though details will be described later, the signature data is described in the bit string 300 as data encrypted using a private key of a public key encryption in this embodiment. Accordingly, in confirming the correctness of the output data 310 using the signature data, it is necessary to decrypt the signature data using a public key corresponding to the private key used for the encryption. Hence, it is also possible to arbitrarily arrange a segment in which a public key ID being identification information for specifying the public key to be used for the decryption, and its mode specifier is defined as "0110".

The second terminator pattern 340 is a bit string (the terminator pattern A) defined in the second standard and indicating the end of the non-output data 330. The terminator pattern A is "0000" that is the same as the terminator pattern in the first standard here, but may be a different pattern.

The padding data 350 is a pattern defined in the second standard as invalid data for filling an extra space. Though a pattern of the same rule as that defined in the first standard in which a repeated part of "11101100" and "00010001" is provided after a 0-addition part where "0" is added until the number of bits of the data becomes a multiple of 8 is used in the example in FIG. 1, a pattern of a rule different from that of the first standard may be used.

The bit string 300 having the above configuration does not comply with the first standard in that the non-output data 330, the second terminator pattern 340, and the padding data 350 exist in the region in which the padding data according to the first standard should exist. However, since merely the content of the bit string is different, a two-dimensional code can be generated by generating code symbols composed of arbitrary modules based on the values of respective bits according to the first standard. The two-dimensional code made by converting the bit string 300 into a two-dimensional code according to the first standard as explained above is the two-dimensional code being the one embodiment of the invention. Note that it is defined in the second standard to employ the same rule as that of the first standard, as the standard for generating code symbols based on the non-output data 330, the second terminator pattern 340, and the padding data 350. Accordingly, the above-described generation of the two-dimensional code according to the first standard can be said to accord also to the second standard regarding the portion of the non-output data 330, the second terminator pattern 340, and the padding data 350.

The two-dimensional code generated in the above contains a first code symbol coding valid information according to the first standard (a code symbol corresponding to the output data 310), a terminator pattern indicating the end of the valid information according to the first standard (a code symbol corresponding to the first terminator pattern 320), a second code symbol arranged after the terminator pattern and cording, according to a second standard, verification data for verifying correctness of the information coded by the first code symbol (a code symbol corresponding to the segment of the signature data in the non-output data 330), and a third code symbol coding error correcting data for correcting errors of the first code symbol and the second code symbol (a code symbol corresponding to the error correcting data 360).

When the above two-dimensional code is read by a reading apparatus supporting the first standard only, only the portion of the output data 310 is taken out as valid data and output. In this case, the portion after the first terminator pattern 320 does not strictly comply with the first standard, but is not a region in which valid data is stored, and is simply ignored, causing no particular influence on a reading process itself. Further, verification of the correctness cannot be performed, but also this point does not cause no particular influence on the operation itself to output the output data 310 as it is.

On the other hand, when a reading apparatus also supporting the second standard like a later-described two-dimensional code reading apparatus 200 reads the two-dimensional code, the non-output data 330 is taken out, in addition to the output data 310, as valid data, the correctness of the output data 310 is verified using the signature data (and the public key ID) contained therein, and the result of the verification can be additionally outputted when outputting the output data 310.

Accordingly, by employing the standard widely used in the world such as the standard in conformity to JIS (Japanese Industrial Standards) as the first standard, it is possible to additionally provide information about the correctness of the output data 310 to a user having a reading apparatus supporting the second standard to thereby improve the security, while retaining an environment in which even a general reading apparatus can read the two-dimensional code and can acquire the output data 310.

Further, according to the method explained here, more non-output data 330 can be described in the two-dimensional code as compared with the method disclosed in PTL1. Accordingly, it is possible to adopt signature data having a longer data length. The length of the signature data depends on the key length, which means that it is possible to adopt a safer and longer key length.

Further, it is conceivable to describe various kinds of information for other usages in addition to the signature data, as the non-output data 330, and use the information for various processes. The other usage is arbitrary, and there are variously conceivable examples such as processing of the output data 310 (such as decryption of the encrypted output data 310), notification to the user of the reading apparatus by light, sound, display of message, and the like.

For example, considering an example of the version 1 of the QR code (trademark), in the standard with the highest correcting capability, it is defined that 72 bits of valid output data and 136 bits of error correcting data should be described in one two-dimensional code. Besides, in the standard with the lowest correcting capability, it is defined that 152 bits of valid output data and 56 bits of error correcting data should be described.

In the method disclosed in PTL1, when one bit of data is written over the output data 510 or error correcting data 540 and recorded, the correcting capability corresponding to two bits of error correcting data is lost. Accordingly, the largest data which can be written over while retaining the lowest correcting capability according to the standard of the version 1 is, data corresponding to $(136-56)/2=40$ bits, by using the standard with the highest correcting capability and sacrificing correcting capability therein up to the difference from the correcting capability of the standard with the lowest correcting capability. In this event, 72 bits of the output data 510 can be described.

On the other hand, in the case of the method of this embodiment, the non-output data 330 will be described at the expense of the region in which the output data is to be described. If it is only necessary to retain the minimum error correction capability, 152 bits of output data can be described. Then, if it is only necessary to describe 72 bits as in the method disclosed in PTL1, the difference $152-72=80$ bits can be used for description of the non-output data 330. However, the first terminator pattern 320 is unnecessary when the output data 310 is described in the whole region prepared for the output data, whereas when the non-output data 330 is described, four bits of first terminator pattern 320 after the output data 310 are required, so that the maximum amount of the non-output data 330 that can be actually described is $80-4=76$ bits.

Though the explanation has been made using the numerical values of the version 1 here, similar results are obtained even when using numerical values of other versions. This also applies to the case of other two-dimensional codes having an error correcting function.

Accordingly, in the method of this embodiment, it can be said that the non-output data 330 of a larger size than that in the method disclosed in PTL1 can be described in the two-dimensional code while retaining sufficient error correction capability (in a sense of according to the widely used standard).

For example, in the case of an elliptic curve DSA (ECDSA: Elliptic Curve Digital Signature Algorithm) signature, the length of the signature data is generally 512 bits. For writing and recording this length over the output data 510 or the error correcting data 540 in the method disclosed in PTL1, the QR code (trademark) of the version 10 or higher is necessary according to the same calculation as above.

On the other hand, in the method of this embodiment, according to the same calculation as above, the 512-bit signature data can be described as the non-output data 330 only by using the QR code (trademark) of the version 6 or higher. Further, in the method of this embodiment, the shorter the output data 310 is, the more the non-output data 330 can be described. Accordingly, when the relatively short output data 310 such as URL (Uniform Resource Locator) is described, the 512-bit signature data can be described in the QR code (trademark) of a lower version. However, since additional data is recorded utilizing a margin of the error correcting capability in the method disclosed in PTL1, the QR code (trademark) of the version 10 or higher is necessary regardless of the length of the output data 510 in order to record the 512-bit signature data.

Therefore, it can be said that in the case of the QR code (trademark) of the same version, the method of this embodiment can use the signature data with higher safety and perform verification with higher reliability for the correctness of the information described as the code symbol than the method disclosed in PTL1.

In addition to the above, in the method disclosed in PTL1, data to be recorded, written over the output data 510 or the error correcting data 540, is not the target of error correction with the error correcting data 540. Thus, if a reading error occurs due to a friction or the like of the code symbol, correction is impossible. On the other hand, in the method of this embodiment, not only the output data 310 but also the non-output data 330 are the target of error correction with the error correcting data 360, so that even if a reading error occurs, correction up to a certain error amount is possible. Accordingly, also in the portion of the non-output data 330 not according to the first standard, reliability can be retained. When an error occurs in the signature data, the result of the verification of the correctness of the output data 510 becomes wrong. Therefore, the capability of error correction of the non-output data 330 including the signature data provides a great effect in enhancing the reliability of the system and the two-dimensional code.

Incidentally, the bit string 300 illustrated in FIG. 1 is configured such that the reading apparatus reading the two-dimensional code and decoding it according to the first standard to acquire a bit string corresponding to the code symbols in the two-dimensional code can easily determine whether or not the non-output data 330 is contained therein. Next, this point will be explained.

FIG. 3 illustrates an example of a configuration of information contained in a two-dimensional code according only to the first standard and not containing the non-output data 330.

A bit string 500 illustrated in FIG. 3 is the same as that illustrated in FIG. 14, and is additionally illustrated here to pay attention on a region 531 of top four bits of the padding data 530 directly after the terminator pattern 520.

Though the rule of the padding data 530 is as has been described, the top four bits are limited to five patterns depending on the number of bits of "0" added in the 0-addition part, such as "1110" for 0 bit, "0111" for one bit, "0011" for two bits, "0001" for three bits, and "0000" for four or more bits.

Hence, by making the top four bits (a region 331) not coincide with any of the above five patterns when arranging the non-output data 330 in the bit string 300 in FIG. 1, it is possible to determine, in reading the two-dimensional code, that the non-output data 330 is arranged on the basis that the four bits directly after the first terminator pattern 320 do not coincide with any of the above five patterns. To enable the determination, the above five patterns are defined as the terminator patterns B in the rule illustrated in FIG. 2, and are not used for specifying the mode in the second standard. Accordingly, it is possible to determine the presence or absence of the non-output data 330, based on whether or not the four bits directly after the first terminator pattern 320 are any one of the terminator patterns B.

Note that the data used for the determination does not always have to be located at the top of the non-output data 330 and does not have to be directly after the first terminator pattern 320. The size of the data does not have to be four bits. Anyway, the same determination is possible by determining the second standard such that the information arranged in a predetermined range after the first terminator pattern 320 does not coincide with the padding data 350 when the non-output data 330 exists, and setting which range of data is used for the determination, in the reading apparatus. Though there occurs a waste in space, it is not essential that the non-output data 330 starts directly after the first terminator pattern 320.

Next, embodiments of a two-dimensional code output system, a two-dimensional code reading system, and methods corresponding thereto of the invention to handle the above-explained two-dimensional code will be explained.

FIG. 4 is a diagram illustrating a use mode of a two-dimensional code output apparatus being one embodiment of the two-dimensional code output system and a two-dimensional code reading apparatus being one embodiment of the two-dimensional code reading system. Note that in the example of FIG. 4, each of the two-dimensional code output apparatus and the two-dimensional code reading apparatus is constituted as a system composed of one apparatus including all necessary functions, but it is of course conceivable to constitute the same system by cooperating a plurality of apparatuses provided with the necessary functions distributed.

A two-dimensional code output apparatus 100 illustrated in FIG. 4 has a function of accepting input of information to be described in the two-dimensional code as the output data 310 and the non-output data 330 illustrated in FIG. 1 and information on a creator of the two-dimensional code, and generating and outputting a two-dimensional code 10 coding the information as illustrated in FIG. 1 wherein signature data encrypted using a private key of the creator of the two-dimensional code is included in the non-output data 330, based on the accepted information. The output can be performed in an arbitrary mode such as display by a display, projection on a screen, printing on a target object by a printer, alteration of the target object by exposure to light, and transmission of image data via a communication path such as a network or the like.

Further, the two-dimensional code output apparatus 100 also has a function of providing the public key corresponding to the private key used for the encryption, together with its ID, to the two-dimensional code reading apparatus 200 (not providing the private key). This provision can be performed by directly transmitting data if the target two-dimensional code reading apparatus 200 is specified, or can be performed by storing them in an appropriate server or the like and keeping them in a state of being acquirable from the two-dimensional code reading apparatus 200 as needed. In addition, the provision can be realized by using an arbitrary method for transmitting information from the two-dimensional code output apparatus 100 to the two-dimensional code reading apparatus 200.

On the other hand, the two-dimensional code reading apparatus 200 has a function of reading the two-dimensional code 10 output from the two-dimensional code output apparatus 100. Though the two-dimensional code presented on the reading target object by any method such as display, projection, printing or the like is optically read here, it is not prohibited to perform reading by a method other than the optical one, such as reading the code symbol supplied as an image data by analysis of the image data, or the like.

The two-dimensional code reading apparatus 200 has a function of decoding the read two-dimensional code 10 to acquire the output data 310 and the non-output data 330. Further, the two-dimensional code reading apparatus 200 has a function of verifying the correctness of the output data 310 using the signature data contained in the non-output data 330, and then outputting the output data 310 together with the result of the verification to a predetermined output destination. The two-dimensional code reading apparatus 200 further has a function of using the other non-output data 330 for various processes. The detail of the internal process to be executed differ depending on the usage of the non-output data 330 and may be a process completed inside the two-dimensional code reading apparatus 200 or may be a process of outputting information to the outside of the two-dimensional code reading apparatus 200.

The output of the output data 310 can be performed by an arbitrary method such as transmission via a communication path such as a network, display by a display, projection on a screen, printing on a target object by a printer, alteration of the target object by exposure to light, output of sound through a speaker, or the like. This also applies to the result of the verification. For example, in the case where the output data 310 is outputted through display on a display device, it is conceivable to perform the display with a verification result message or mark such as "this is reliable information" when the verification is successful or "this is possibly tampered" when the verification is failed, attached thereto. Alternatively, it is conceivable to transmit the result of the verification as data that can be a trigger of the same display in an apparatus at the transmission destination.

Next, the configuration of the two-dimensional code output apparatus 100 will be explained in more detail. FIG. 5 is a diagram illustrating its hardware configuration, and FIG. 6 is a diagram illustrating its functional configuration.

As illustrated in FIG. 5, the two-dimensional code output apparatus 100 has a configuration including a CPU 101, a ROM 102, a RAM 103, a storage 104, a communication I/F (interface) 105, an operation part 106, and a display part 107, which are connected by a system bus 108.

The CPU 101 executes a required program stored in the ROM 102 or the storage 104 using the RAM 103 as a work area and thereby controls the whole two-dimensional code output apparatus 100 so as to realize various functions including those illustrated in FIG. 6.

The communication I/F 105 is an interface for communicating with other apparatuses such as an information input apparatus, an information output apparatus and the like over an arbitrary communication channel such as a network or the like. It is only necessary to provide a communication I/F according to the standard for the communication path to be used.

The operation part 106 is an operation device for accepting operations from a user, and can be composed of various keys, switches, touch panels and the like.

The display part 107 is a presenting device for presenting the operation state and setting status of the two-dimensional code output apparatus 100, and message and the like to the user, and includes a liquid crystal display, a lamp, and so on.

Note that the operation part 106 and the display part 107 may be external ones. Besides, in the case where the two-dimensional code output apparatus 100 does not have to directly accept operations from the user (accepting operations and presenting information through an external apparatus connected via the communication I/F 105 is enough), the operation part 106 and the display part 107 can be omitted.

For the two-dimensional code output apparatus 100, a general-purpose computer can also be used as hardware.

Further, as illustrated in FIG. 6, the two-dimensional code output apparatus 100 has, as functions related to the generation of the two-dimensional code, functions of an output data accepting part 111, a non-output data accepting part 112, a creator information accepting part 113, a first encoding part 114, a second encoding part 115, a private key acquisition part 116, a signature data addition part 117, an error correcting data addition part 118, a two-dimensional code generation part 119, a two-dimensional code output part 120, a public key transmission part 121, and a key management part 131.

The output data accepting part 111 has a function of accepting input of information (first information) to be described, as the output data 310, in the two-dimensional code 10. The non-output data accepting part 112 has a function of accepting input of information (second information), other than the public key ID and the verification data for verifying correctness of the output information 310, to be described in the two-dimensional code 10 as the non-output data 330.

The creator information accepting part 113 has a function of accepting information on the creator of the two-dimensional code. The way to specify the creator is arbitrary and the creator may be an individual, a corporation, or an arbitrarily defined unit such as a department, a job title or the like. The creator is not only a person but may be an apparatus or a program. It is conceivable that the same person or organization becomes different creators according to the usage of the two-dimensional code. Further, in the case where the two-dimensional code output apparatus 100 is shared among a plurality of creators, it is preferable to accept authentication information such as a password, biological information or the like for authenticating the creator in addition to identification information for specifying the creator, as the information on the creator.

The respective information described above may be inputted by the user or may be received from another apparatus through communication. Besides, information selected by the user or information automatically selected based on some conditions among the information stored in advance in the two-dimensional code output apparatus 100 or another apparatus may be read. Besides, the information may be automatically generated based on some parameters selected by the user or automatically decided. In addition, the input can be accepted by an arbitrary method, and the input accepting method may be changed depending on some conditions. The input of information may be accepted by methods different among the accepting parts 111 to 113.

The first encoding part 114 has a function of encoding the information accepted by the output data accepting part 111 according to the first standard to thereby convert it into a bit string of the output data 310 illustrated in FIG. 1, and adding the first terminator pattern 320 thereto if there is a margin up to the maximum amount of data.

The second encoding part 115 has a function of encoding the information accepted by the non-output data accepting part 112 and the public key ID provided from the private key acquisition part 116, according to the second standard to thereby convert them into a bit string of (a part of) the non-output data 330 illustrated in FIG. 1, coupling it to the bit string generated by the first encoding part 114.

The private key acquisition part 116 has a function of acquiring the private key of the creator of the two-dimensional code and the public key ID of the public key corresponding to the private key from the key management part 131 based on the information accepted by the creator information accepting part 113, after authenticating a person inputting the information as the creator relating to the inputted information using the authentication information, as needed. The private key acquisition part 116 further has a function of supplying the public key ID to the second encoding part 115 and the public key transmission part 121 and supplying the private key to the signature data addition part 117. The private key of the creator is desirably registered in advance in the key management part 131. However, it is conceivable that when the private key of the creator cannot be acquired from the key management part 131 for a reason that the private key has not been created yet or the like, the private key acquisition part 116 creates by itself a new pair of private key and public key or makes an external key generation apparatus create a private key to thereby acquire the private key. Further, the apparatus that creates the key preferably has a function of providing the created public key and its public key ID to the two-dimensional code output apparatus 100 and the two-dimensional code reading apparatus 200.

Note that the key management part 131 has a function of managing the pair of private key and public key in association with the information on the creator of the two-dimensional code. The private key is preferably held in an encrypted state using, for example, a password or the like set by the owner so as to prevent the private key from leaking even if the memory is dumped. Further, the public key preferably contains information such as the public key ID, name, title, address and so on for identifying the owner of the key pair, as bibliographic information. It is preferable to use a public key certificate electronically signed by a reliable certificate authority so as to guarantee that the bibliographic information and the key itself are not tampered.

The above key management part 131 desirably stores the key in the storage 104 in the two-dimensional code output apparatus 100 in order to prevent the private key from leaking due to interception of communication or the like, but is not limited to this.

Further, the creator of the two-dimensional code may be allowed to input his/her private key and the public key ID of the public key corresponding to the private key from the operation part 106. In this case, the private key and the public key ID themselves can be grasped as the information on the creator, the private key acquisition part 116 acquires the private key and the public key ID from the creator information accepting part 113 which accepts the input.

The signature data addition part 117 has a function of creating the signature data to be added to the bit string supplied from the second encoding part 115 using the private key supplied from the private key acquisition part 116, encoding the signature data according to the second standard, and coupling the encoded signature data to the bit string generated by the second encoding part 115 as a bit string of (a part of) the non-output data 330 illustrated in FIG. 1. Further, the signature data addition part 117 has a function of further adding the second terminator pattern 340 and the padding data 350 to the bit string if there is a margin up to the maximum amount of data.

Note that the signature data can be generated, for example, by calculating a hash value of the bit string supplied from the second encoding part 115 and encrypting the hash value using the private key. If the segment in which the public key ID is described is also included in a target for which the hash value is calculated, it can be confirmed using the hash value that the public key ID has not been tampered, in reading the two-dimensional code 10. However, it is not essential to calculate hash values of all bit strings supplied from the second encoding part 115, but the hash value only for the bit string in a range for which the correctness is to be confirmed in reading should be calculated. However, it is necessary that the two-dimensional code reading apparatus 200 can grasp, in reading, the information about which range the hash value has been found.

The error correcting data addition part 118 has a function of generating the error correcting data 360 for correcting an error in reading, based on the bit string after the addition of the signature data by the signature data addition part 117, and adding it to the bit string. Thus, the bit string 300 illustrated in FIG. 1 is generated.

The two-dimensional code generation part 119 has a function of converting the bit string 300 into a code symbol according to the first standard to thereby generate the two-dimensional code 10.

The two-dimensional code output part 120 has a function of outputting the two-dimensional code 10 generated by the two-dimensional code generation part 119, by a suitable method.

The public key transmission part 121 has a function of, when the public key ID is supplied from the private key acquisition part 116, acquiring the public key having the public key ID from the key management part 131, and transmitting the public key together with the public key ID to the two-dimensional code reading apparatus 200. This transmission is performed to enable the two-dimensional code reading apparatus 200 to surely decrypt the signature data in reading the two-dimensional code 10 created this time.

Accordingly, it is conceivable to set the address or the like of the two-dimensional code reading apparatus 200 assumed to read the two-dimensional code 10 in advance in the two-dimensional code output apparatus 100 and transmit the public key and the public key ID to the address, or to prepare a server to which the two-dimensional code reading apparatus 200 assumed to read the two-dimensional code 10 can access and transmit the public key and the public key ID to the server so that the two-dimensional code reading apparatus 200 can arbitrarily acquire the public key and the public key ID. Further, it is basically not necessary to transmit the public key transmitted once, to the same transmission destination again. Further, it is also conceivable that the public key transmission part 121 periodically uploads the public key stored in the key management part 131 together with the public key ID to a server to which the two-dimensional code reading apparatus 200 can access regardless of the operation of the private key acquisition part 116.

The two-dimensional code output apparatus 100 can generate and output the two-dimensional code 10 in which the data having the configuration explained using FIG. 1 and FIG. 2 is described by the functions of the above parts. Note that in the case where the description of the non-output data 330 is unnecessary, namely, the non-output data accepting part 112 does not accept the input of information and the signature data is not necessary, the second encoding part 115 and the signature data addition part 117 needs only to add the padding data 530 illustrated in FIG. 3. This enables the two-dimensional code output apparatus 100 to generate and output the two-dimensional code 10 not containing the non-output data 330, in which the data having the configuration explained using FIG. 3 is described.

Next, the configuration of the two-dimensional code reading apparatus 200 will be explained in more detail. FIG. 7 is a diagram illustrating its hardware configuration, and FIG. 8 is a diagram illustrating its functional configuration.

As illustrated in FIG. 7, the two-dimensional code reading apparatus 200 is an apparatus including an optical part 210, a decoder 220, an operation part 231, and a notification part 232, for reading the two-dimensional code 10 represented by a symbol different in light reflectance from the surroundings on a reading target object 20 by directing the optical part 210 toward the reading target object 20.

The optical part 210 is a reader including an imaging sensor 211, a lens 212, and a pulse LED (light-emitting diode) 213, for optically reading the two-dimensional code 10.

The imaging sensor 211 is an imager for capturing an image of the reading target object 20. The imaging sensor 21 can be composed of, for example, a CMOS (complementary metal oxide semiconductor) image sensor. Besides, the imaging sensor 211 can generate image data indicating a gradation value of each pixel on the basis of electric charges accumulated in each pixel of the image sensor by capturing the image, and output the image data to the decoder 220. In this imaging sensor 211, pixels are two-dimensionally arranged.

The lens 212 is an optical system for forming an image of reflected light from the reading target object 20 including the two-dimensional code 10, on the imaging sensor 211.

The pulse LED 213 is an illuminator for irradiating the reading target object 20 being an image-capturing target with illumination light.

Next, the decoder 220 includes a CPU 221, a ROM 222 which stores programs executed by the CPU 221 and data such as various tables, a RAM 223 which is used as a working area when the CPU 221 executes various processes, and a communication OF 224 for communicating with external apparatuses.

As the above CPU 221, ROM 222, and RAM 223, for example, an ASIC (Application Specific Integrated Circuit), a Flash ROM (FROM), an SDRAM (Synchronous Dynamic Random Access Memory), and so on can be used.

The CPU 221 controls operations of the whole two-dimensional code reading apparatus 200 including the optical part 210, the operation part 231, and the notification part 232 by executing programs stored in the ROM 222 while using the RAM 223 as working area. The CPU 221 further performs processes such as detection and decoding of the two-dimensional code 10 included in the image data of the image captured by the imaging sensor 211, output of the decoding result to an external part or accumulation, adjustment of the illumination light amount (or time) by the pulse LED 213, and so on.

The communication I/F 224 is an interface for communicating with data processing apparatuses such as a PC (personal computer) which processes the decoding result by the decoder 220, and an arbitrary standard regardless of wired or wireless is applicable thereto. Besides, control parameters may be set in the decoder 220 based on data read from the communication I/F 224.

The operation part 231 is an operation device such as a button and a trigger for accepting operations of the user.

The notification part 232 is a notifier for performing various notifications to the user. Conceivable concrete notification methods include, but not limited to, display of message and data by a display, lighting or blinking of a lamp, output of sounds by a speaker and so on.

Besides, as illustrated in FIG. 8, the two-dimensional code reading apparatus 200 has, as functions relating to reading of the two-dimensional code, functions of a code symbol reading part 241, a first decoding part 242, an error correction part 243, a valid data acquisition part 244, a non-output data acquisition part 245, a data verification part 246, a public key acquisition part 247, a verification result addition part 248, an information output part 249, another processing part 250, a public key reception part 251, and a public key database (DB) 261.

The code symbol reading part 241 has a function of reading the two-dimensional code 10 by the optical part 210 to acquire the image of the two-dimensional code 10.

The first decoding part 242 has a function of a decoder which decodes the image of the code symbol acquired by the code symbol reading part 241, according to the first standard, and converts the image into a bit string. The error correction part 243 has a function of an error corrector which performs, on the bit string acquired from the first decoding part 242, an error correction process using the error correcting data contained therein. The target of the error correction is the whole bit string before the error correcting data, and the target of the error correction is not only the output data (310 in FIG. 1 or 510 in FIG. 5) but also the non-output data (330 in FIG. 1) if contained. The two-dimensional code reading apparatus 200 determines that the reading this time fails when the decoding or the error correction has failed, and performs next reading.

The valid data acquisition part 244 has a function of a first acquirer which acquires the output data (310 in FIG. 1 or 510 in FIG. 5) from the bit string after the error correction by the error correction part 243, and decodes it according to the first standard to return a bit string in each segment to the information before the encoding to thereby acquire first information being the valid data according to the first standard. The valid data acquisition part 244 further has a function of passing a bit string after the terminator pattern (320 in FIG. 1 or 520 in FIG. 3) according to the first standard, if existing, to the non-output data acquisition part 245.

The non-output data acquisition part 245 has a function of a second acquirer which acquires the non-output data (330 in FIG. 1), if existing, from the bit string passed from the valid data acquisition part 244, and decodes it according to the second standard to return a bit string in each segment to the information before the encoding to thereby acquire second information being the valid data according to the second standard.

The non-output data acquisition part 245 further has a function of passing, when having acquired the second information, the second information to the functional part performing a necessary process on the basis of the setting made in the two-dimensional code reading apparatus 200 or the specification of the kind of process included in the second information in order to execute the processes based on the second information. In the example of FIG. 8, when the signature data and the public key ID are contained in the second information, the non-output data acquisition part 245 passes these pieces of information to the data verification part 246. The non-output data acquisition part 245 further passes the other parts of the second information to the other processing part 250 in charge of the process based on the information. The process performed by the other processing part 250 may be processing or addition to the information to be outputted from the information output part 249.

The data verification part 246 has a function of a verifier which verifies the correctness of the information acquired by the valid data acquisition part 244 and the non-output data acquisition part 245 using the signature data and the public key ID passed from the non-output data acquisition part 245. In the process of the verification, the data verification part 246 makes the public key acquisition part 247 acquire the public key corresponding to the public key ID, and decrypts the signature data using the public key. Further, the data verification part 246 calculates the hash value of the bit string in the range where correctness should be confirmed of the bit string after the error correction by the error correction part 243, compares the hash value with the decryption result of the signature data. When they coincide with each other, the data verification part 246 can confirm that the bit string has not been tampered. Further, when bibliographic items of the public key are reliable, it can also be confirmed that the bit string has been created by a person described in the bibliographic items of the public key. The data verification part 246 supplies the above result of verification to the verification result addition part 248.

The public key acquisition part 247 has a function of a public key acquirer which acquires the public key having the designated public key ID from the public key DB 261 according to the request from the data verification part 246, and passes the public key to the data verification part 246. The public key DB 261 is a database which stores the public key in association with the public key ID. It is conceivable to receive and register the public key transmitted from the public key transmission part 121 of the two-dimensional code output apparatus 100 through the function of the public key reception part 251. It is also conceivable to access a predetermined server periodically or when an unregistered public key is required, and acquire and register the public key.

The verification result addition part 248 has a function of adding information indicating the result of the verification by the data verification part 246 to the information acquired by the valid data acquisition part 244 to generate data to be outputted as a reading result of the two-dimensional code 10.

The information output part 249 has a function of an output device which outputs the first information to which the result of the verification is added by the verification result addition part 248 by an appropriate method. When the correctness of the first information cannot be confirmed, the information output part 249 may output only the verification result but not the first information.

The two-dimensional code reading apparatus 200 can read the two-dimensional code 10 in which the data having the configuration explained using FIG. 1 is described, verify the correctness of the output data 310 using the signature data and the public key ID contained therein, and then output the first information obtained by decoding the output data 310 together with the result of the verification, by the functions of the above parts. The signature data and the public key ID are information described in the two-dimensional code 10, but the two-dimensional code reading apparatus 200 never outputs them as the reading result.

Note that when the read two-dimensional code does not contain the non-output data 330, namely, the two-dimensional code 10 in which the data having the configuration explained using FIG. 3 is described is read, the non-output data acquisition part 245 cannot acquire the signature data, and therefore the data verification part 246 cannot verify the correctness. In this case, the verification result addition part 248 only needs to add the information that there is no signature data used for verification, as the result of the verification. Alternatively, the verification result addition part 248 may add none of the result of verification but merely output data following the first standard.

In the two-dimensional code reading apparatus 200, the verification of the correctness of the output data 310 can be performed only using the information described in the two-dimensional code 10 itself and the public key (and the public key ID for searching for the public key) which causes no problem if known by a third party. Accordingly, if the function of verification and the information necessary for the verification are not integrated to a specific fraudulence detection apparatus but imparted to an individual two-dimensional code reading apparatus 200, the security can be retained. It is also possible to avoid the risk for interception of the communication between the two-dimensional code reading apparatus 200 and the fraudulence detection apparatus to result in leakage of the information which should be confidentially held for verification. Therefore, it is possible to provide an environment in which fraudulence to information described by the two-dimensional code can be detected by a simple system while retaining high reliability.

It is necessary to confidentially hold the private key of the creator of the two-dimensional code on the two-dimensional code output apparatus 100 side, but the two-dimensional code output apparatus 100 is considered to be often in hand of a person who creates the two-dimensional code using the private key and is thus easy to manage as compared with the two-dimensional code reading apparatus 200, so that the risk for leakage of the private key to the outside can be appropriately managed on the responsibility of the creator.

Next, the processes corresponding to the functions illustrated in FIG. 6 and FIG. 8 executed by the two-dimensional code output apparatus 100 or the two-dimensional code reading apparatus 200 will be explained. These processes are processes relating to the embodiment of the two-dimensional code output method or the two-dimensional code reading method of the invention. Further, the processes illustrated in the following flowcharts are performed by the CPU 101 of the two-dimensional code output apparatus 100 or the CPU 221 of the two-dimensional code reading apparatus 200 executing required programs, but explained as those executed by the two-dimensional code output apparatus 100 or the two-dimensional code reading apparatus 200 for easy explanation.

First, FIG. 9 illustrates a flowchart of a process of generating a two-dimensional code containing the non-output data, executed by the two-dimensional code output apparatus 100.

When instructed to generate the two-dimensional code with a signature by a predetermined user operation, command or the like, the two-dimensional code output apparatus 100 starts the process illustrated in FIG. 9.

In this process, the two-dimensional code output apparatus 100 first accepts input of information to be described as the output data 310 in FIG. 1, information to be described as the non-output data 330 in FIG. 1, and information on the creator (S11 to S13). This process corresponds to the functions of the output data accepting part 111, the non-output data accepting part 112, and the creator information accepting part 113.

Next, the two-dimensional code output apparatus 100 encodes the information accepted in step S11 by the encoding process on the output data in FIG. 10 to generate the bit string of the output data 310 and the first terminator pattern 320 (S14). This process corresponds to the function of the first encoding part 114.

More specifically, the two-dimensional code output apparatus 100 executes the process of taking out the information corresponding to one segment from the information accepted in step S11 and generating a bit string of the segment according to the first standard (S31), and coupling it to the bit string generated up to here (S32), and repeatedly executes the process for all of the segments (S33). The boundary of the segment is determined depending on the item of information and the kind of character, and a definition by the first standard may be adopted.

If the first standard is decided by the provider or the user of the two-dimensional code output apparatus 100, it is conceivable that when the information accepted in step S11 is composed of a plurality of items of information, at least the boundary of the item is regarded as the boundary of the segment. Besides, it is conceivable that a change of the kind of character such as a change from numeric characters to Chinese characters is regarded as the boundary of the segment.

When the bit string generated up to step S33 is shorter by four or more bits than the maximum size of the output data 310, namely, when there is a margin to add the first terminator pattern 320 (S34), the two-dimensional code output apparatus 100 adds the first terminator pattern 320 by coupling (S35), and returns to the process in FIG. 9. When there is no margin in step S34, the two-dimensional code output apparatus 100 returns to the process in FIG. 9 without coupling the first terminator pattern 320.

Next, the two-dimensional code output apparatus 100 acquires the private key and the public key ID corresponding to the creator information accepted in step S13 (S15). This process corresponds to the function of the private key acquisition part 116.

Thereafter, the two-dimensional code output apparatus 100 encodes, according to the second standard, the information accepted in step S12 and the public key ID acquired in step S15 to generate (a part of) the bit string of the non-output data 330 and couples it to the bit string generated in step S13 (S16). This process corresponds to the function of the second encoding part 115. A concrete procedure is the same as that of steps S31 to S33 in FIG. 10 except that the standard which the procedure accords to is different.

Next, the two-dimensional code output apparatus 100 calculates hash value of the bit string generated up to step S16 (S17), and encrypts the hash value using the private key acquired in step S15 to thereby generate the signature data (S18). Thereafter, the two-dimensional code output apparatus 100 generates the bit string of the segment of the generated signature data according to the second standard and couples it to the bit string generated up to step S16 (S19). Then, when the bit string generated up to step S19 is shorter by four or more bits than the maximum size describable in the two-dimensional code, namely, when there is a margin to add the second terminator pattern 340, the two-dimensional code output apparatus 100 adds the second terminator pattern 340 (S20). The process in steps S17 to S20 corresponds to the function of the signature data addition part 117.

Note that when the generated bit string becomes longer than the maximum size describable in the two-dimensional code except the error correcting data 360 at any point in the process up to here, the two-dimensional code output apparatus 100 regards it as failure of the generation of the two-dimensional code, and performs an error process.

Next, the two-dimensional code output apparatus 100 generates a bit string of the padding data 350 by a padding data addition process in FIG. 11 and couples it to the bit string generated up to step S20 (S21). This process also corresponds to the function of the signature data addition part 117.

More specifically, unless the number of bits of the bit string generated up to here is a multiple of 8 (S41), the two-dimensional code output apparatus 100 adds a bit of "0" to the generated bit string until the number of bits becomes a multiple of 8 (S42). Thereafter, the two-dimensional code output apparatus 100 adds a predetermined repeated pattern to the bit string until the bit string becomes the maximum size describable in the two-dimensional code (S43), and returns to the process in FIG. 9.

Next, the two-dimensional code output apparatus 100 generates the error correcting data 360 based on the bit string generated in the process up to step S22 and adds it to the bit string (S22). This process corresponds to the function of the error correcting data addition part 118.

The bit string 300 is completed here, and the two-dimensional code output apparatus 100 generates the two-dimensional code 10 coding the bit string generated up to here according to the first standard (S23), outputs it to a suitable output destination (S24), and ends the process in FIG. 9. These processes correspond to the functions of the two-dimensional code generation part 119 and the two-dimensional code output part 120.

The two-dimensional code output apparatus 100 can generate and output the two-dimensional code 10 in which the data having the configuration explained using FIG. 1 is described and the signature data and the public key ID is contained, by the above processes. Note that in the case of generating the two-dimensional code not containing the signature data and the public key ID, the two-dimensional code output apparatus 100 merely skips steps S12, S13 and S15 to S20.

Further, a public key transmission process corresponding to the function of the public key transmission part 121 may be performed in some portion in the process of FIG. 9, or arbitrarily performed as needed asynchronously with the process of FIG. 9.

Next, FIG. 12A and FIG. 12B illustrates a flowchart of the reading process of the two-dimensional code executed by the two-dimensional code reading apparatus 200.

When instructed to read the two-dimensional code by a predetermined user operation, command or the like, the two-dimensional code reading apparatus 200 starts a process illustrated in FIG. 12A and FIG. 12B. At this point in time, it is not necessary to consider whether or not the signature data is contained in the two-dimensional code being a reading target.

In the process of FIG. 12A and FIG. 12B, the two-dimensional code reading apparatus 200 first acquires the image of the two-dimensional code 10 being the reading target, and performs decoding and error correction according to the first standard to obtain the bit string 300 (or the bit string 500) (S51). This process will fail if the two-dimensional code 10 is not accommodated in a frame or the brightness and focus at image capturing are not appropriate, and is therefore repeated until the process succeeds while the conditions are appropriately changed (S52). This process is a process of a decoding step and an error correction step, and corresponds to the functions of the code symbol reading part 241, the first decoding part 242 and the error correction part 243.

Next, the two-dimensional code reading apparatus 200 acquires the portion of the output data 310 (or 510) from the bit string of the decoding result in step S51, and converts it into the information before the encoding according to the first standard (S53). This process is a process of a first acquisition step and corresponds to the function of the valid data acquisition part 244.

Next, the two-dimensional code reading apparatus 200 determines whether or not the four bits directly after the first terminator pattern 320 (or 520) of the decoding result are any one of the terminator patterns B in the second standard (S54). If this result is No (not any one of them), the two-dimensional code reading apparatus 200 determines that the non-output data 330 is contained in the decoding result, and proceeds to step S55 and subsequent steps.

The two-dimensional code reading apparatus 200 analyzes the bit string after the first terminator pattern 320 of the decoding result according to the second standard, and converts the portion of the non-output data 330 into the information before the encoding (S55). The process in steps S54 and S55 is a process of a second acquisition step and corresponds to the function of the non-output data acquisition part 245.

Next, the two-dimensional code reading apparatus 200 determines whether or not the signature data exists in the information acquired by the conversion in step S55, namely, whether or not the segment of the signature data exists in the non-output data 330 (S56). Here, when it exists, the two-dimensional code reading apparatus 200 proceeds to the process of step S57 and subsequent steps for verification of the correctness of the data using the signature data.

In this process, the two-dimensional code reading apparatus 200 first acquires the bit string before the segment of the signature data of the decoding result in step S51 and calculates its hash value (S57). Since all of the output data 310 and the non-output data 330, except the signature data, is the target for the verification here, the hash value is calculated in this range. However, the target for the verification may be only the output data 310. Next, the two-dimensional code reading apparatus 200 decrypts the signature data in the non-output data 330 acquired in step S55 using the public key indicated by the public key ID in the non-output data 330 (S58). The public key is acquired from the public key DB 261. Then, the two-dimensional code reading apparatus 200 determines whether or not the hash value calculated in step S57 and the decryption result in step S58 coincide with each other (S59).

When they coincide with each other here, the two-dimensional code reading apparatus 200 determines that the signature is valid and the correctness has been verified (S60). In this case, if information other than the signature data and the public key ID exists in the non-output data before the encoding acquired in step S55, the two-dimensional code reading apparatus 200 executes the process according to the data (S61). When they do not coincide with each other in step S59, the two-dimensional code reading apparatus 200 determines that the signature is invalid and the private key used for the signature does not correspond to the public key indicated by the public key ID or the data has been broken, tampered or the like (S62). In this case, since the correctness of the non-output data cannot be confirmed, the two-dimensional code reading apparatus 200 does not perform the process in step S61 using the non-output data.

The processes in steps S57 to S60 and S62 are processes of the verification procedure corresponding to the function of the data verification part 246, and the process in step S61 corresponds to the function of the other processing part 250. The process of acquiring the public key in step S58 is the process of the public key acquisition procedure corresponding to the function of the public key acquisition part 247.

In any case, the two-dimensional code reading apparatus 200 outputs the output data before the encoding acquired in step S53 (or the output data after the process in step S61) together with the determination result of the signature to a predetermined output destination (S63), and ends the process of FIG. 12A and FIG. 12B. This process corresponds to the functions of the verification result addition part 248 and the information output part 249.

Besides, with Yes (any one of them) in step S54, the two-dimensional code reading apparatus 200 determines that the non-output data is not contained in the decoding result and therefore the correctness of data cannot be verified, and determines that there is no signature in step S64, and outputs the output data before the encoding in step S63. When the two-dimensional code coding the data having the configuration illustrated in FIG. 3 is read, the flow will branch to this. In this case, since the correctness of the data has not been verified, the data may be handled as with the case where the signature is invalid. This also applies to the case where there is no signature data in step S56.

The two-dimensional code reading apparatus 200 can read the two-dimensional code 10 in which the data having the configuration explained using FIG. 1 or FIG. 3 is described, by the above process, then verify the correctness of the output data before the encoding, and output the output data together with the verification result.

Hereinabove, the explanation of the embodiments is completed, and the concrete configurations of the code symbol, system and apparatus, the concrete process procedure, the form of data, the concrete data content, the standard to be adopted and so on are not limited to those explained in the embodiments.

For example, the two-dimensional code of the standard of representing data by arraying square white (high reflectance) modules and black (low reflectance) modules is used in the above embodiments, but is not limited to them. A two-dimensional code in which bar modules are two-dimensionally arrayed and a two-dimensional code in which hexagonal modules are arrayed may be used.

Besides, it is not essential that the pattern of the padding data is defined in the standard, and the data after the terminator pattern may be arbitrary.

Further, the information on the public key ID is described in the two-dimensional code in the above-described embodiment, but this is not essential. When the private key used for the signature is a specific one or the number of candidates of the public key is at the level where all of the candidates can be tried, it is possible to verify the correctness of data without the information on the public key ID.

Further, the above-described embodiment is configured such that the non-output data 330 can be described, in addition to the signature data and the public key ID, in the two-dimensional code 10. However, the non-output data 330 may be only the signature data and the public key ID. In this case, the non-output data accepting part 112 is unnecessary.

Further, the signature data made by encrypting the hash value of the data being the verification target of the correctness is used as the verification data in the above-described embodiment, but use of the hash value and the form of "signature" are not necessary.

The embodiment of the program of the invention is a program for causing one computer or a plurality of computers in cooperation to control required hardware so as to realize the functions of the two-dimensional code output apparatus 100 or the two-dimensional code reading apparatus 200 in the above-explained embodiments, or to execute the processes explained in the above-explained embodiments.

Such a program may be stored in a ROM or another non-volatile storage medium (flash memory, EEPROM, or the like) originally included in the computer. The program can be provided while being recorded on an arbitrary non-volatile recording medium such as a memory card, a CD, a DVD, a Blu-ray Disc or the like. The program can also be downloaded from an external apparatus connected to the network, and installed into and executed by the computer.

Further, the configurations of the above-explained embodiments and modified examples can be embodied in an arbitrary combination unless they are inconsistent with one another and, as a matter of course, can be embodied while taking out only parts of them.

REFERENCE SIGNS LIST

10 . . . two-dimensional code, 20 . . . reading target object, 100 . . . two-dimensional code output apparatus, 200 . . . two-dimensional code reading apparatus, 210 . . . optical part, 220 . . . decoder, 300, 500 . . . bit string, 310, 510 . . . output data, 320, 340, 520 . . . terminator pattern, 330 . . . non-output data, 350, 530 . . . padding data, 360, 540 . . . error correcting data

The invention claimed is:

1. A two-dimensional code output system comprising at least one processor or circuitry or a combination thereof configured to:
accept input of first information via an input device;
encode the first information according to a first standard, into a first bit string;
generate verification data for verifying correctness of the first bit string;
encrypt the verification data using a private key into encrypted verification data;
encode the encrypted verification data according to a second standard into a second bit string;
generate a combined bit string including the first bit string, terminator data indicating an end of valid information according to the first standard, and the second bit string in this order;
convert the combined bit string into a two-dimensional code according to the first standard, thereby generating the two-dimensional code comprising: a first code symbol coding the first information as a first valid information according to the first standard; a terminator pattern coding the terminator data; and a second code symbol arranged after the terminator pattern in a region in which valid information can be arranged according to the first standard and coding the encrypted verification data according to the second standard; and
output the two-dimensional code.

2. The two-dimensional code output system according to claim 1,
wherein the second code symbol includes a code symbol coding, according to the second standard, identification information of a public key corresponding to the private key.

3. The two-dimensional code output system according to claim 1,
wherein the at least one processor or circuitry or the combination is further configured to:
accept input of information on a creator via an input device; and
acquire a private key corresponding to the information on the creator from a predetermined acquisition destination, and
wherein the encrypting of the verification data is encrypting the verification data using the acquired private key.

4. A two-dimensional code output method comprising:
accepting input of first information via an input device;
encoding the first information according to a first standard, into a first bit string;
generating verification data for verifying correctness of the first bit string;
encrypting the verification data using a private key into encrypted verification data;
encoding the encrypted verification data according to a second standard into a second bit string;
generating a combined bit string including the first bit string, terminator data indicating an end of valid information according to the first standard, and the second bit string in this order;
converting the combined bit string into a two-dimensional code according to the first standard, thereby generating the two-dimensional code comprising: a first code symbol coding the first information as a first valid information according to the first standard; a terminator pattern coding the terminator data; and a second code symbol arranged after the terminator pattern in a region in which valid information can be arranged according to the first standard and coding the encrypted verification data according to the second standard; and
outputting the two-dimensional code.

5. The two-dimensional code output method according to claim 4,
wherein the second code symbol includes a code symbol coding, according to the second standard, identification information of a public key corresponding to the private key.

6. The two-dimensional code output method according to claim 4, further comprising:
accepting input of information on a creator by an input device; and
acquiring a private key corresponding to the information on the creator from a predetermined acquisition destination,
wherein the encrypting of the verification data is encrypting the verification data using the acquired private key.

7. A non-transitory machine-readable storage medium containing program instructions executable by a computer, and when executed, causing one computer or a plurality of computers in cooperation to execute the two-dimensional code output method according to claim 4.

8. A two-dimensional code reading system comprising at least one processor or circuitry or a combination thereof configured to:
reads a two-dimensional code by a reader, decode the two-dimensional code according to a first standard having a definition of a terminator pattern indicating an end of valid information, and thereby obtaining a decoding result;
acquire valid information according to the first standard from the decoding result, as first information; and
analyze information after the terminator pattern of the decoding result according to a second standard different from the first standard, and thereby acquire verification data;
acquire a public key from a predetermined acquisition destination;
decrypt the verification data using the acquired public key to obtain decrypted data;
compare the decrypted data with the first information to verify correctness of the first information; and
output the first information together with information indicating a result of the verification.

9. The two-dimensional code reading system according to claim 8,
wherein the at least one processor or circuitry or the combination is further configured to acquire identification information of the public key from a result of the analysis of the information after the terminator pattern, and wherein, as the public key, a public key corresponding to the acquired identification information is acquired.

10. The two-dimensional code reading system according to claim 8, wherein the at least one processor or circuitry or the combination is further configured to, in a case of failing to acquire the verification data through the analysis of the information after the terminator pattern, output the first information together with information indicating that there is no verification data.

11. A two-dimensional code reading method comprising:

reading a two-dimensional code by a reader, decode the two-dimensional code according to a first standard having a definition of a terminator pattern indicating an end of valid information, and thereby obtaining a decoding result;

acquiring valid information according to the first standard from the decoding result, as first information; and analyzing information after the terminator pattern of the decoding result according to a second standard different from the first standard, and thereby acquiring verification data;

acquiring a public key from a predetermined acquisition destination;

decrypting the verification data using the acquired public key to obtain decrypted data;

comparing the decrypted data with the first information to verify correctness of the first information; and outputting the first information together with information indicating a result of the verification.

12. The two-dimensional code reading method according to claim 11, further comprising acquiring identification information of the public key from a result of the analysis of the information after the terminator pattern, wherein, as the public key, a public key corresponding to the acquired identification information is acquired.

13. The two-dimensional code reading method according to claim 11, further comprising outputting the first information together with information indicating that there is no verification data, in a case of failing to acquire the verification data through the analysis of the information after the terminator pattern.

14. A non-transitory machine-readable storage medium containing program instructions executable by a computer, and when executed, causing one computer or a plurality of computers in cooperation to execute the two-dimensional code reading method according to claim 11.

* * * * *